US012668020B2

(12) United States Patent
Kobayashi

(10) Patent No.: US 12,668,020 B2
(45) Date of Patent: Jun. 30, 2026

(54) THREE-DIMENSIONAL OBJECT PRINTING APPARATUS AND METHOD

(71) Applicant: SEIKO EPSON CORPORATION, Tokyo (JP)

(72) Inventor: Hajime Kobayashi, Chino (JP)

(73) Assignee: SEIKO EPSON CORPORATION (JP)

( * ) Notice: Subject to any disclaimer, the term of this patent is extended or adjusted under 35 U.S.C. 154(b) by 84 days.

(21) Appl. No.: 18/616,361

(22) Filed: Mar. 26, 2024

(65) Prior Publication Data

US 2024/0326321 A1 Oct. 3, 2024

(30) Foreign Application Priority Data

Mar. 27, 2023 (JP) .................................. 2023-049544

(51) Int. Cl.
| | |
|---|---|
| *B29C 64/112* | (2017.01) |
| *B25J 9/02* | (2006.01) |
| *B25J 11/00* | (2006.01) |
| *B29C 64/209* | (2017.01) |
| *B29C 64/379* | (2017.01) |
| *B33Y 10/00* | (2015.01) |
| *B33Y 30/00* | (2015.01) |
| *B33Y 40/00* | (2020.01) |

(52) U.S. Cl.
CPC ............. *B29C 64/112* (2017.08); *B25J 9/026* (2013.01); *B25J 11/005* (2013.01); *B29C 64/209* (2017.08); *B29C 64/379* (2017.08); *B33Y 10/00* (2014.12); *B33Y 30/00* (2014.12); *B33Y 40/00* (2014.12)

(58) Field of Classification Search
CPC ... B29C 64/112; B29C 64/209; B29C 64/379; B33Y 30/00
See application file for complete search history.

(56) References Cited

U.S. PATENT DOCUMENTS

| | | | |
|---|---|---|---|
| 2019/0184633 A1* | 6/2019 | Sydow | ................. B29C 64/118 |
| 2021/0170769 A1 | 6/2021 | Hyuga et al. | |
| 2021/0300061 A1 | 9/2021 | Boniface et al. | |
| 2022/0040924 A1* | 2/2022 | Newell | ................. B29C 64/379 |

FOREIGN PATENT DOCUMENTS

| | | |
|---|---|---|
| DE | 202019001174 U1 | 4/2019 |
| JP | 2012-035552 A | 2/2012 |
| JP | 2015098103 A | 5/2015 |

* cited by examiner

*Primary Examiner* — Larry W Thrower
(74) *Attorney, Agent, or Firm* — Harness, Dickey & Pierce, P.L.C.

(57) ABSTRACT

There is provided a three-dimensional object printing apparatus including: a first head that ejects a first liquid from a first nozzle onto a workpiece; a second head that ejects a second liquid from a second nozzle onto the workpiece; a first Z movement mechanism that moves the first head along a Z-axis; a second Z movement mechanism that moves the second head along the Z-axis; an X movement mechanism that moves the first head and the second head along an X-axis intersecting with the Z-axis by collectively moving the first Z movement mechanism and the second z movement mechanism along the X-axis; and an articulated robot that supports the workpiece.

12 Claims, 14 Drawing Sheets

MC — TRANSPORT OPERATION

MP1 — FIRST PRINTING OPERATION

ME — HEAD RETRACTING OPERATION

MF — FEEDING OPERATION

MP2 — SECOND PRINTING OPERATION

MC — TRANSPORT OPERATION

MP1 — FIRST PRINTING OPERATION

ME — HEAD RETRACTING OPERATION

MR — WORKPIECE ROTATION OPERATION

MP3 — THIRD PRINTING OPERATION

THREE-DIMENSIONAL OBJECT PRINTING APPARATUS AND METHOD

The present application is based on, and claims priority from JP Application Serial Number 2023-049544, filed Mar. 27, 2023, the disclosure of which is hereby incorporated by reference herein in its entirety.

BACKGROUND

1. Technical Field

The present disclosure relates to a three-dimensional object printing apparatus and method.

2. Related Art

In the related art, a three-dimensional object printing apparatus that performs printing on a surface of a three-dimensional workpiece by an ink jet method is known. For example, an apparatus described in JP-A-2012-035552 includes a plurality of heads and a head raising and lowering mechanism for raising and lowering the plurality of heads. In this apparatus, the ink jet head is mounted on a carriage that moves vertically and a workpiece which is a printing target is placed on a table, and the workpiece on the table and the carriage are movable relative to each other in an XY direction.

In the apparatus in the related art as described in JP-A-2012-035552, a position of the workpiece is adjusted by a jig or the like on the table such that a printing surface of the workpiece faces the head. Meanwhile, since a mounting surface opposite to the printing surface of the workpiece is not always a flat surface, there is a problem that the jig needs to be manually replaced or adjusted each time a type of workpiece or the printing surface is changed.

SUMMARY

According to an aspect of the present disclosure, there is provided a three-dimensional object printing apparatus including: a first head that ejects a first liquid from a first nozzle onto a workpiece; a second head that ejects a second liquid from a second nozzle onto the workpiece; a first Z movement mechanism that moves the first head along a Z-axis; a second Z movement mechanism that moves the second head along the Z-axis; an X movement mechanism that moves the first head and the second head along an X-axis intersecting with the Z-axis by collectively moving the first Z movement mechanism and the second Z movement mechanism along the X-axis; and an articulated robot that supports the workpiece.

According to an aspect of the present disclosure, there is provided a three-dimensional object printing method for a three-dimensional object printing apparatus comprising a first head that ejects a first liquid from a first nozzle onto a workpiece, a second head that ejects a second liquid from a second nozzle onto the workpiece, a first Z movement mechanism that moves the first head along a Z-axis, a second Z movement mechanism that moves the second head along the Z-axis, an X movement mechanism that moves the first head and the second head along an X-axis intersecting with the Z-axis by collectively moving the first Z movement mechanism and the second Z movement mechanism along the X-axis, and an articulated robot that supports the workpiece, comprising: a first printing operation in which the first head and the second head eject the first liquid and the second liquid toward a first printing region on the workpiece and the articulated robot does not change a position or a posture of the workpiece.

DESCRIPTION OF EMBODIMENTS

Figure 1:
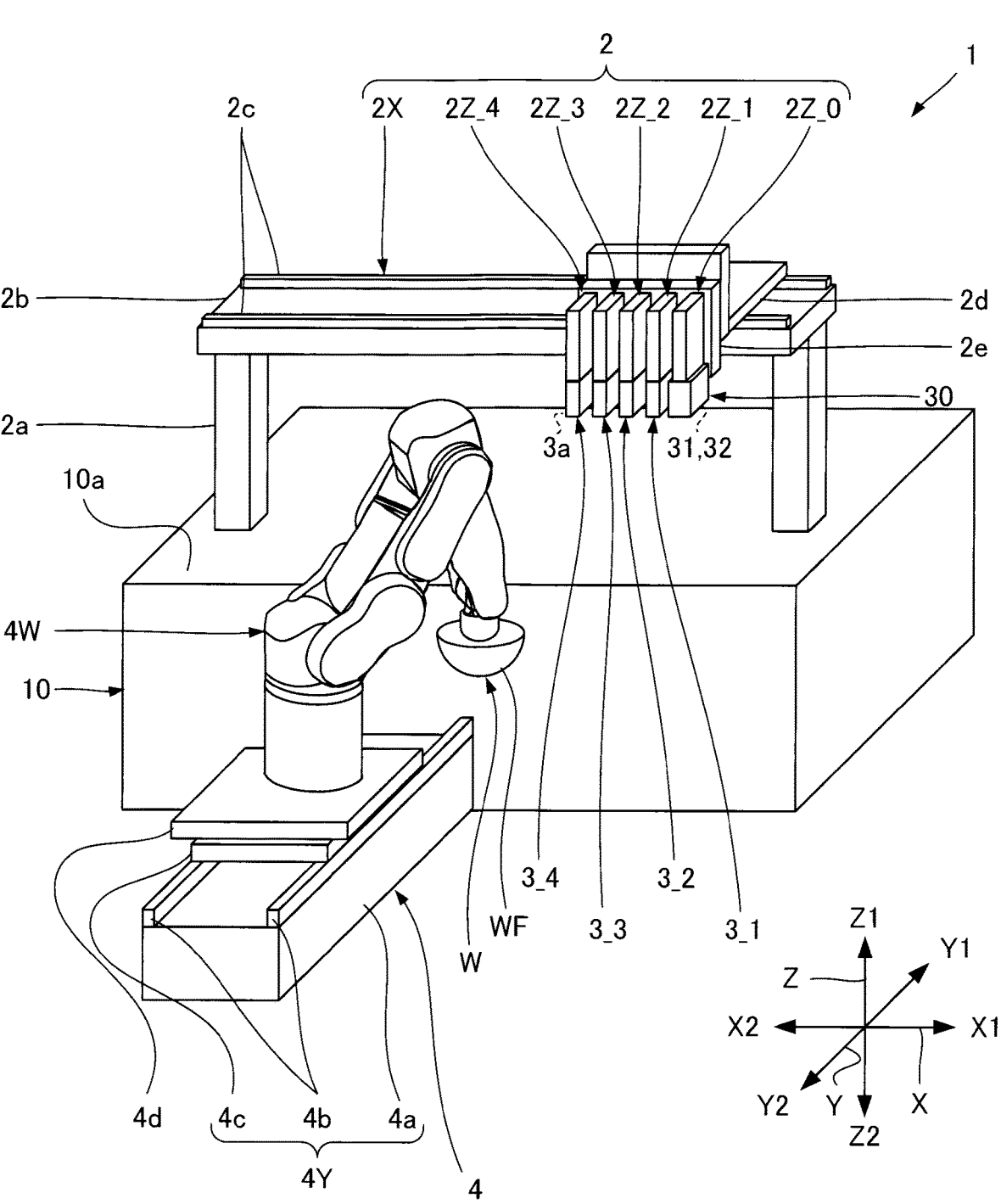
FIG. 1 is a perspective view illustrating an overview of a three-dimensional object printing apparatus according to a first embodiment.

Hereinafter, appropriate embodiments according to the present disclosure will be described with reference to the accompanying drawings. In the drawings, dimensions and scale of each portion are appropriately different from the actual ones, and some portions are schematically illustrated for easy understanding. In addition, the scope of the present disclosure is not limited to the forms unless the present disclosure is particularly limited in the following description.

In the following description, for convenience, an X-axis, a Y-axis, and a Z-axis that intersect each other will be appropriately used. Further, in the following description, one direction along the X-axis is an X1 direction, and a direction opposite to the X1 direction is an X2 direction. In the same manner, directions opposite to each other along the Y-axis are a Y1 direction and a Y2 direction. Further, directions opposite to each other along the Z-axis are a Z1 direction and a Z2 direction.

Here, the X-axis, the Y-axis, and the Z-axis correspond to the coordinate axes of a world coordinate system set in a space in which a movement mechanism 2 and a support mechanism 4, which will be described below, are installed. Typically, the Z-axis is a vertical axis, and the Z2 direction corresponds to a downward direction in a vertical direction. In the following, for convenience, a case is described in which an operation of the movement mechanism 2 is controlled by using the world coordinate system.

The Z-axis may not be the vertical axis. Further, the X-axis, the Y-axis, and the Z-axis are typically orthogonal to each other, but the present disclosure is not limited to this, and the X-axis, the Y-axis, and the Z-axis may not be orthogonal to each other. For example, the X-axis, Y-axis, and Z-axis may intersect with each other at an angle within a range equal to or more than 80° and equal to or less than 100°.

1. First Embodiment

1-1. Overview of Printing Apparatus

FIG. 1 is a perspective view illustrating an overview of a three-dimensional object printing apparatus 1 according to a first embodiment. The three-dimensional object printing apparatus 1 is an apparatus that performs printing on a surface of a three-dimensional workpiece W by an ink jet method.

The workpiece W has a surface WF including a region as a printing target. In the example illustrated in FIG. 1, the workpiece W is a substantially hemispherical body, and the surface WF is a substantially projecting spherical surface. A size, a shape, or an installation posture of the workpiece W is not limited to the example illustrated in FIG. 1, and is selected in any manner.

As illustrated in FIG. 1, the three-dimensional object printing apparatus 1 includes a base 10, the movement mechanism 2, head units 3_1 to 3_4, a sensor unit 30, and the support mechanism 4. Hereinafter, each portion of the three-dimensional object printing apparatus 1 will be briefly described in sequence with reference to FIG. 1. In the following, each of the head units 3_1 to 3_4 may be referred to as a head unit 3.

The base 10 is a base having a surface 10a that supports the movement mechanism 2. The surface 10a faces the Z1 direction. Here, the movement mechanism 2 is directly fixed to the base 10 by screwing and the like or is indirectly fixed to the base 10 via another member.

In the example illustrated in FIG. 1, the base 10 has a box shape, and the surface 10a is a surface facing the Z1 direction. A case may be disposed at a position of to the base 10 in the Z1 direction. The case is a box-shaped structure that forms a space for accommodating a structure such as the movement mechanism 2 supported by the base 10 with the surface 10a, and includes, for example, a plurality of columns and a plurality of beams made of metal or the like, and a plurality of plate materials such as a top plate and a wall plate made of a transparent material such as acrylic resin.

A configuration of the base 10 is not limited to the example illustrated in FIG. 1, and is selected in any manner. In addition, the base 10 may be provided when necessary, or may be omitted. When the base 10 is omitted, each component of the three-dimensional object printing apparatus 1 is installed on a floor, a wall, or a ceiling of a building, for example.

The movement mechanism 2 is a mechanism that changes a relative position of the head units 3_1 to 3_4 and the sensor unit 30 with respect to the workpiece W between a direction along the X-axis and a direction along the Y-axis. The movement mechanism 2 includes an X movement mechanism 2X and Z movement mechanisms 2Z_0 to 2Z_4. Here, the Z movement mechanism 2Z_1 is an example of a "first Z movement mechanism", and the Z movement mechanism 2Z_2 is an example of a "second Z movement mechanism". In the following, each of the Z movement mechanisms 2Z_0 to 2Z_4 may be referred to as a Z movement mechanism 2Z.

The X movement mechanism 2X is a linear motion mechanism that changes each relative position of the head unit 3 and the sensor unit 30 with respect to the workpiece W along the X-axis orthogonal to the Z-axis. In the example illustrated in FIG. 1, the X movement mechanism 2X supports the head units 3_1 to 3_4 and the sensor unit 30 via the Z movement mechanisms 2Z_0 to 2Z_4, and the Z movement mechanisms 2Z_0 to 2Z_4 are collectively moved along the X-axis. Thus, the head units 3_1 to 3_4 and the sensor unit 30 are moved along the X-axis with respect to the workpiece W.

The X movement mechanism 2X has a pair of columns 2a, a beam 2b, a pair of rails 2c, and a movable body 2d. These are made of a metal such as iron, stainless steel, or an aluminum alloy, for example.

Each of the pair of columns 2a is a member extending in the Z1 direction from the surface 10a of the base 10. In the example illustrated in FIG. 1, the pair of columns 2a are aligned in a direction along the X-axis. The beam 2b is bridged at tips of the pair of columns 2a. The beam 2b is a member supported by the pair of columns 2a. In the example illustrated in FIG. 1, the beam 2b extends in a direction along the X-axis and has a plate shape in which a direction along the Z-axis is a thickness direction. The pair of rails 2c are disposed on a surface of the beam 2b facing the Z1 direction. Each of the pair of rails 2c is a linear rail that guides the movable body 2d to move the movable body 2d relative to the pair of columns 2a and the beam 2b in a direction along the X-axis, and extends in a direction along the X-axis. The movable body 2d is attached to the pair of rails 2c via a linear motion bearing (not illustrated). The movable body 2d is a member that moves relatively to the pair of columns 2a and the beam 2b in the direction along the X-axis. In the example illustrated in FIG. 1, the movable body 2d has a plate shape in which a direction along the Z-axis is a thickness direction. Although not illustrated, the X movement mechanism 2X includes an actuator having an electric motor such as a servomotor that generates a drive force for the movement, and an encoder such as a linear encoder that measures the operation amount of the movement. The configuration of the X movement mechanism 2X is not limited to the example illustrated in FIG. 1.

The Z movement mechanisms 2Z_0 to 2Z_4 are attached to the movable body 2d of the above X movement mechanism 2X via a support body 2e. Thus, as the movable body 2d moves, the Z movement mechanisms 22_0 to 2Z_4 are moved in a direction along the X-axis.

Here, the support body 2e is attached to the movable body 2d via a linear motion mechanism (not illustrated). The linear motion mechanism moves the support body 2e in a direction along the Z-axis with respect to the movable body 2d. Thus, the Z movement mechanisms 22_0 to 2Z_4 collectively move in the direction along the Z-axis. The linear motion mechanism may be, for example, an electric mechanism configured in the same manner as the Z movement mechanism 2Z or may be a manual mechanism. When the linear motion mechanism is the electric type, the linear motion mechanism may be driven and controlled at a time of printing.

Each of the Z movement mechanisms 2Z_1 to 2Z_4 is a linear motion mechanism that moves the head unit 3 with respect to the workpiece W along the Z-axis. In the example illustrated in FIG. 1, the Z movement mechanisms 2Z_1 to 2Z_4 are attached to the movable body 2d of the X movement mechanism 2X described above via the support body 2e, and move the head unit 3 in the direction along the Z-axis. In addition, the Z movement mechanisms 2Z_1 to 2Z_4 are arranged in the X2 direction in this order.

Here, the head units 3_1 to 3_4 correspond on a one-to-one basis to the Z movement mechanisms 2Z_1 to 2Z_4, respectively. The corresponding head unit 3 is attached to each of the Z movement mechanisms 2Z_1 to 2Z_4. Therefore, the Z movement mechanism 2Z_1 changes a relative position of the head unit 3_1 with respect to the workpiece W in the direction along the Z-axis. In the same manner, the Z movement mechanisms 2Z_2 to 2Z_4 respectively change relative positions of the head units 3_2 to 3_4 with respect to the workpiece W in the direction along the Z-axis. In this manner, the Z movement mechanisms 2Z_1 to 2Z_4 change the relative positions of the head units 3_1 to 3_4 with respect to the workpiece W independently in the direction along the Z-axis.

On the other hand, the Z movement mechanism 22_0 is a linear motion mechanism that moves the sensor unit 30 with respect to the workpiece W along the Z-axis, and operates independently of each of the Z movement mechanisms 2Z_1 to 2Z_4 described above. The sensor unit 30 is attached to the Z movement mechanism 2Z_0. In the example illustrated in FIG. 1, the Z movement mechanism 2Z_0 is attached to the movable body 2d of the X movement mechanism 2X described above via the support body 2e, and moves the sensor unit 30 in the direction along the Z-axis. In this manner, the Z movement mechanism 2Z_0 changes a relative position of the sensor unit 30 with respect to the workpiece W in the direction along the Z-axis independently of each of the head units 3_1 to 3_4. In addition, the Z movement mechanism 2Z_0 is adjacent to the Z movement mechanism 2Z_1 at a position in the X1 direction. That is, the Z movement mechanisms 2Z_0 to 2Z_4 are arranged in the X2 direction in this order.

The above Z movement mechanisms 2Z_0 to 2Z_4 are configured in the same manner as each other, except that the targets of movement are different from each other as described above. Although not illustrated, each of the Z movement mechanisms 2Z_0 to 2Z_4 has a rail, a movable body, an actuator, and an encoder. The rail is fixed to the support body 2e, and is a linear rail extending in the direction along the Z-axis. The movable body is attached to the rail via a linear motion bearing, and moves in the direction along the Z-axis. The actuator has an electric motor such as a servomotor that generates a drive force for the movement. The encoder is a linear encoder or the like that measures the operation amount of the movement. The configurations of the Z movement mechanisms 2Z_0 to 2Z_4 may be different from each other. Meanwhile, from the viewpoint of cost reduction and the like, the Z movement mechanisms 2Z_0 to 2Z_4 preferably have the same configuration as each other. In addition, the Z movement mechanism 2Z_0 may be provided as needed, or may be omitted.

Although not illustrated in FIG. 1, the head unit 3 or the sensor unit 30 is attached to the movable body via an adjustment mechanism for finely adjusting a posture of the head unit 3 or the sensor unit 30. A specific example of the adjustment mechanism will be described below with reference to FIG. 4.

Each of the head units 3_1 to 3_4 is an assembly having a head 3a that ejects an ink, which is an example of a "liquid", toward the workpiece W. Here, a head 3a_1 to be described below, which is the head 3a included in the head unit 3_1, is an example of a "first head", and a head 3a_2 to be described below, which is the head 3a of the head unit 3_2, is an example of a "second head". Details of the head unit 3 will be described below with reference to FIG. 4.

The ink is not particularly limited, and in the present embodiment, a curable ink using a curable resin such as a thermosetting type, a photocurable type, a radiation curable type, and an electron beam curable type is used. The ink is not limited to an ink containing a coloring material, and may be, for example, an ink containing conductive particles such as metal particles for forming wiring or the like as a dispersant, a clear ink, or a treatment liquid for surface treatment on the workpiece W.

Wiring and a supply pipe (not illustrated) are coupled to the head unit 3. The wiring supplies an electric signal for driving the head 3a to the head 3a. The supply pipe is a flexible pipe body that supplies inks from an ink tank (not illustrated) to the head unit 3. The types of ink used for the head units 3_1 to 3_4 may be the same as or different from each other.

The sensor unit 30 is an assembly having a sensor 31 that detects a positional relationship with the workpiece W. In the example illustrated in FIG. 1, the sensor unit 30 has the sensor 31 and an energy emitting portion 32.

The sensor 31 includes, for example, one or both of a contact-type sensor that detects a contact with the workpiece W and an optical displacement sensor that detects a distance from the workpiece W. The energy emitting portion 32 emits energy such as light, heat, an electron beam, or radiation for curing or solidifying inks on the workpiece W. The energy emitting portion 32 is configured with, for example, a light emitting element such as a light emitting diode (LED) that emits ultraviolet rays. Further, one or both of the sensor 31 and the energy emitting portion 32 may be provided as needed, or may be omitted.

The support mechanism 4 is a mechanism that supports the workpiece W. In the example illustrated in FIG. 1, the support mechanism 4 has a Y movement mechanism 4Y and an articulated robot 4W.

The Y movement mechanism 4Y is a linear motion mechanism that moves the articulated robot 4W along the Y-axis. With this movement, the relative positions of the head units 3_1 to 3_4 and the sensor unit 30 with respect to the workpiece W can be changed in the direction along the Y-axis.

The Y movement mechanism 4Y has a support body 4a, a pair of rails 4b, and a movable body 4c. These are made of a metal such as iron, stainless steel, or an aluminum alloy, for example.

The support body 4a is a base that is fixedly installed. In the example illustrated in FIG. 1, the support body 4a extends in the direction along the Y-axis, and has a plate shape in which the direction along the Z-axis is a thickness direction. The pair of rails 4b are arranged on a surface of the support body 4a facing the Z1 direction. The support body 4a may be fixed to the base 10 described above, or may be integrally configured with the base 10. A shape of the support body 4a is not limited to the example illustrated in FIG. 1, and is selected in any manner.

Each of the pair of rails 4b is a linear rail that guides the movable body 4c to move the movable body 4c relatively to the support body 4a in the direction along the Y-axis, and extends in the direction along the Y-axis. The movable body 4c is attached to the pair of rails 4b via a linear motion bearing (not illustrated). The pair of rails 4b may be integrally configured with the support body 4a.

The movable body 4c is a member that moves relatively to the support body 4a in the direction along the Y-axis. In the example illustrated in FIG. 1, the movable body 4c has a plate shape in which a direction along the Z-axis is a thickness direction. Although not illustrated, the Y movement mechanism 4Y includes an actuator having an electric motor such as a servomotor that generates a drive force for the movement, and an encoder such as a linear encoder that measures the operation amount of the movement. A stage 4d is attached to the movable body 4c by screwing or the like.

The stage 4d is a member that supports the articulated robot 4W. In the example illustrated in FIG. 1, the stage 4d has a plate shape. The adjustment mechanism may have an electric configuration including an actuator and an encoder, or may have a manually adjustable configuration. Further, the stage 4d may be integrally configured with the movable body 4c.

The articulated robot 4W is attached to the stage 4d of the above Y movement mechanism 4Y by screwing or the like. By the operation of the above Y movement mechanism 4Y, the workpiece W can be moved with high accuracy along the Y-axis without operating the articulated robot 4W.

The articulated robot 4W supports the workpiece W. The articulated robot 4W can change a position and a posture of the workpiece W, and supports the workpiece W at a desired position and posture with which an ink ejected from the heads 3a of the head units 3_1 to 3_4 can be applied, when a printing operation is executed. A configuration of the articulated robot 4W will be described below with reference to FIG. 3.

As the above overview, the three-dimensional object printing apparatus 1 includes the heads 3a of the head units 3_1 to 3_4, the Z movement mechanisms 2Z_1 to 2Z_4, the X movement mechanism 2X, and the articulated robot 4W. Here, as described above, each of the heads 3a of the head units 3_1 to 3_4 ejects an ink, which is an example of a "liquid", from a nozzle N to be described below. The Z movement mechanisms 2Z_1 to 2Z_4 move the heads 3a of the head units 3_1 to 3_4 along the Z-axis. The X movement mechanism 2X moves the heads 3a of the head units 3_1 to 3_4 along the X-axis by collectively moving the Z movement mechanisms 2Z_1 to 2Z_4 along the X-axis intersecting with the Z-axis. The articulated robot 4W supports the three-dimensional workpiece W to which the ink ejected from the heads 3a of the head units 3_1 to 3_4 is applied.

As described above, since the articulated robot 4W supports the workpiece W, the workpiece W can be installed in a desired posture with respect to the head 3a of the head units 3_1 to 3_4, regardless of a three-dimensional shape of the workpiece W. Therefore, while operating the Z movement mechanisms 2Z_1 to 2Z_4 and the X movement mechanism 2X, the ink can be ejected from the heads 3a of the head units 3_1 to 3_4 with high accuracy toward a printing region on the workpiece W. In this manner, printing with high accuracy can be performed on the three-dimensional workpiece W while the workpiece W is easily installed. Hereinafter, the three-dimensional object printing apparatus 1 will be described in detail.

1-2. Electric Configuration of Printing Apparatus

Figure 2:
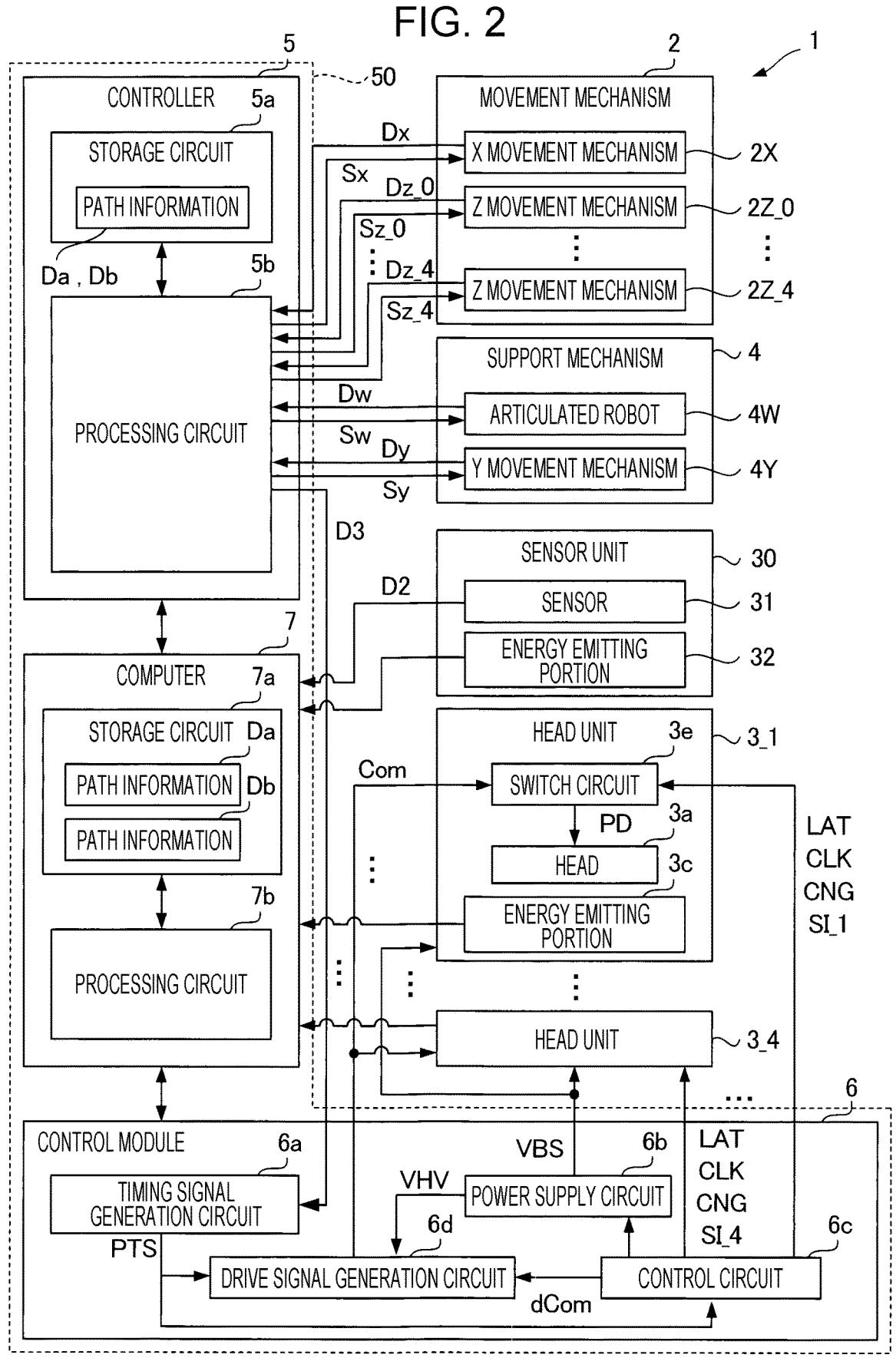
FIG. 2 is a block diagram illustrating an electrical configuration of the three-dimensional object printing apparatus according to the first embodiment.

FIG. 2 is a block diagram illustrating an electrical configuration of the three-dimensional object printing apparatus 1 according to the first embodiment. In FIG. 2, among components of the three-dimensional object printing apparatus 1, electrical components are illustrated. As illustrated in FIG. 2, the three-dimensional object printing apparatus 1 includes a control portion 50, in addition to the components illustrated in FIG. 1 described above.

The control portion 50 controls operations of the movement mechanism 2, the head units 3_1 to 3_4, the support mechanism 4, and the sensor unit 30. In the example illustrated in FIG. 2, the control portion 50 includes a controller 5, a control module 6, and a computer 7. Hereinafter, the controller 5, the control module 6, and the computer 7 will be sequentially described.

Each electrical component illustrated in FIG. 2 may be appropriately divided, a part thereof may be included in another component, or may be integrally formed with the other component. For example, a part or the entirety of the functions of the controller 5 or the control module 6 may be realized by the computer 7, or may be realized by another external apparatus such as a personal computer (PC) coupled to the controller 5 via a network such as a local area network (LAN) or the Internet.

The controller 5 has a function of controlling the drive of the movement mechanism 2 and the support mechanism 4 and a function of generating a signal D3 for synchronizing an ink ejection operation of the head unit 3 with the operation of the movement mechanism 2.

The controller 5 has a storage circuit 5a and a processing circuit 5b.

The storage circuit 5a stores various programs to be executed by the processing circuit 5b and various types of data to be processed by the processing circuit 5b. A part or all of the storage circuit 5a may be included in the processing circuit 5b.

The storage circuit 5a stores path information Da and path information Db.

The path information Da is information which is used for controlling the operation of the movement mechanism 2 and indicates a position of the head 3a in movement paths RU1 and RU2, which will be described below, along which the head 3a is to be moved, as a target position. The path information Da is represented by using, for example, coordinate values of the world coordinate system. Here, the target position of the head 3a during printing indicated by the path information Da is set such that the head 3a is at a minute distance from the workpiece W. The path information Da is generated by the computer 7 based on workpiece data representing a shape of at least a part of the workpiece W. The workpiece data is, for example, standard triangulated language (STL) format computer-aided design (CAD) data, or is data obtained by measuring a shape of the workpiece W by a three-dimensional camera. The path information Da is input from the computer 7 to the storage circuit 5a. The path information Da may be represented by using coordinate values of a workpiece coordinate system. In this case, the path information Da is used for controlling the operation of the movement mechanism 2 after being converted from the coordinate value of the workpiece coordinate system to the coordinate value of the world coordinate system.

The path information Db is information which is used for controlling the operation of the support mechanism 4 and indicates a position and a posture of the workpiece W in a movement path of the workpiece W, as a target position and a target posture. The path information Db is represented by using, for example, coordinate values of the world coordinate system. Here, the path information Db includes information used for controlling the Y movement mechanism 4Y and information used for controlling the articulated robot 4W. The information used for controlling the Y movement mechanism 4Y includes information indicating a target position of a base portion 410, which will be described below, of the articulated robot 4W in a direction along the Y-axis. The information used for controlling the articulated robot 4W includes information indicating a target position and a target posture of the workpiece W with respect to the stage 4d of the Y movement mechanism 4Y. Further, the path information Db includes information indicating a position and a posture of the workpiece W during the printing as a target position and a target posture. The target position and the target posture of the workpiece W during the printing indicated by the path information Db are set such that, for example, a variation in distance between a plurality of nozzles N (to be described below) of the head 3a and the workpiece W is as small as possible. The path information Db is generated by the computer 7 according to a setting of the user. The path information Db is input from the computer 7 to the storage circuit 5a.

The processing circuit 5b controls the operations of the movement mechanism 2 and the support mechanism 4, and generates the signal D3.

Specifically, the processing circuit 5b performs a calculation for converting the path information Da into an operation amount such as a movement amount and a movement speed of the movement mechanism 2. The processing circuit 5b outputs control signals Sx, and Sz_0 to Sz_4 based on output signals Dx, and Dz_0 to Dz_4 from each encoder of the movement mechanism 2 such that the actual operation amount of the movement mechanism 2 becomes the calculation result described above. The output signal Dx is a signal output from the encoder of the X movement mechanism 2X. The output signals Dz_0 to Dz_4 are signals output from encoders of the Z movement mechanisms 2Z_0 to 2Z_4. The control signal Sx is a signal for controlling the drive of the actuator of the X movement mechanism 2X. The control signals Sz_0 to Sz_4 are signals for controlling the drive of the actuators of the Z movement mechanisms 22_0 to 2Z_4. Here, the control signals Sx, and Sz_0 to Sz_4 are corrected by the processing circuit 5b based on an output signal D2 from the sensor 31 of the sensor unit 30, as needed.

In addition, the processing circuit 5b performs an inverse kinematics calculation which is a calculation for converting the path information Db into an operation amount such as a rotation angle and a rotation speed of each joint of the articulated robot 4W. The processing circuit 5b outputs a control signal Sw based on an output Dw from the encoder provided in each joint of the articulated robot 4W such that an operation amount such as an actual rotation angle and an actual rotation speed of each of the joints becomes the calculation result described above. The control signal Sw is a signal for controlling a drive of a motor provided in each joint of the articulated robot 4W.

Further, the processing circuit 5b generates the signal D3 based on at least one of the output signals Dx, and Dz_0 to Dz_4. For example, the processing circuit 5b may generate the signal D3 including a pulse at a timing at which the output signal Dx has a predetermined value, or may output the output signal Dx as it is as the signal D3.

The control module 6 is a circuit that controls an ink ejection operation in the head unit 3 based on the signal D3 output from the controller 5 and print data from the computer 7. The control module 6 includes a timing signal generation circuit 6a, a power supply circuit 6b, a control circuit 6c, and a drive signal generation circuit 6d.

The timing signal generation circuit 6a generates a timing signal PTS based on the signal D3. The timing signal generation circuit 6a is configured with, for example, a timer that starts generation of the timing signal PTS when the signal D3 is detected, or a circuit that generates a signal including a pulse at a timing synchronized with a pulse of the output signal Dx as the timing signal PTS when the signal D3 is the output signal Dx.

The power supply circuit 6b receives power from a commercial power supply (not illustrated) to generate various predetermined potentials. For example, the power supply circuit 6b generates a power supply potential VHV and an offset potential VBS. The offset potential VBS is supplied to the head unit 3. Further, the power supply potential VHV is supplied to the drive signal generation circuit 6d.

The control circuit 6c generates control signals SI_1 to SI_4, a waveform designation signal dCom, a latch signal LAT, a clock signal CLK, and a change signal CNG, based on the timing signal PTS. These signals are synchronized with the timing signal PTS. Among these signals, the waveform designation signal dCom is input to the drive signal generation circuit 6d, and the other signals are input to a switch circuit 3e of the head unit 3. The control signals SI_1 to SI_4 correspond on a one-to-one basis to the head units 3_1 to 3_4, respectively. In the following, each of the control signals SI_1 to SI_4 may be referred to as a control signal SI.

The control signal SI is a digital signal for designating an operation state of a drive element included in the head 3a of the head unit 3. Specifically, the control signal SI is a signal for designating whether or not to supply a drive signal Com, which will be described below, to the drive element based on the print data. With this designation, for example, whether or not to eject inks from a nozzle corresponding to the drive element is designated, and the amount of ink ejected from the nozzle is designated. The waveform designation signal dCom is a digital signal for defining a waveform of the drive signal Com. The latch signal LAT and the change signal CNG are signals for defining an ejection timing of the ink from the nozzle, in combination with the control signal SI, by defining a drive timing of the drive element. The clock signal CLK is a reference clock signal synchronized with the timing signal PTS.

The above control circuit 6c includes, for example, one or more processors such as a CPU.

The drive signal generation circuit 6d is a circuit that generates the drive signal Com for driving each drive element included in the head 3a of the head unit 3. Specifically, the drive signal generation circuit 6d includes, for example, a DA conversion circuit and an amplifier circuit. In the drive signal generation circuit 6d, the DA conversion circuit converts the waveform designation signal dCom from the control circuit 6c from a digital signal to an analog signal, and the amplifier circuit uses the power supply potential VHV from the power supply circuit 6b to amplify the analog signal and generate the drive signal Com. Here, among waveforms included in the drive signal Com, a signal of a waveform actually supplied to the drive element is a drive pulse PD. The drive pulse PD is supplied from the drive signal generation circuit 6d to the drive element, via the switch circuit 3e of the head unit 3.

Here, the switch circuit 3e is a circuit including a switching element that switches whether or not to supply at least a part of the waveform included in the drive signal Com as the drive pulse PD based on the control signal SI.

The computer 7 is, for example, a desktop-typed computer in which a program is installed. The computer 7 has a function of generating the path information Da and Db, a function of supplying information such as the path information Da and Db to the controller 5, a function of supplying information such as print data to the control module 6, and a function of accepting an instruction from an operator. In addition to these functions, the computer 7 according to the present embodiment has a function of controlling a drive of an energy emitting portion 3*c* of the head unit 3 and the energy emitting portion 32 of the sensor unit 30.

The computer 7 has a storage circuit 7*a* and the processing circuit 7*b*. The storage circuit 7*a* stores various programs to be executed by the processing circuit 7*b* and various types of data such as the path information Da to be processed by the processing circuit 7*b*.

The processing circuit 7*b* realizes various functions by reading the program from the storage circuit 7*a* and executing the program.

1-3. Configuration of Articulated Robot

Figure 3:
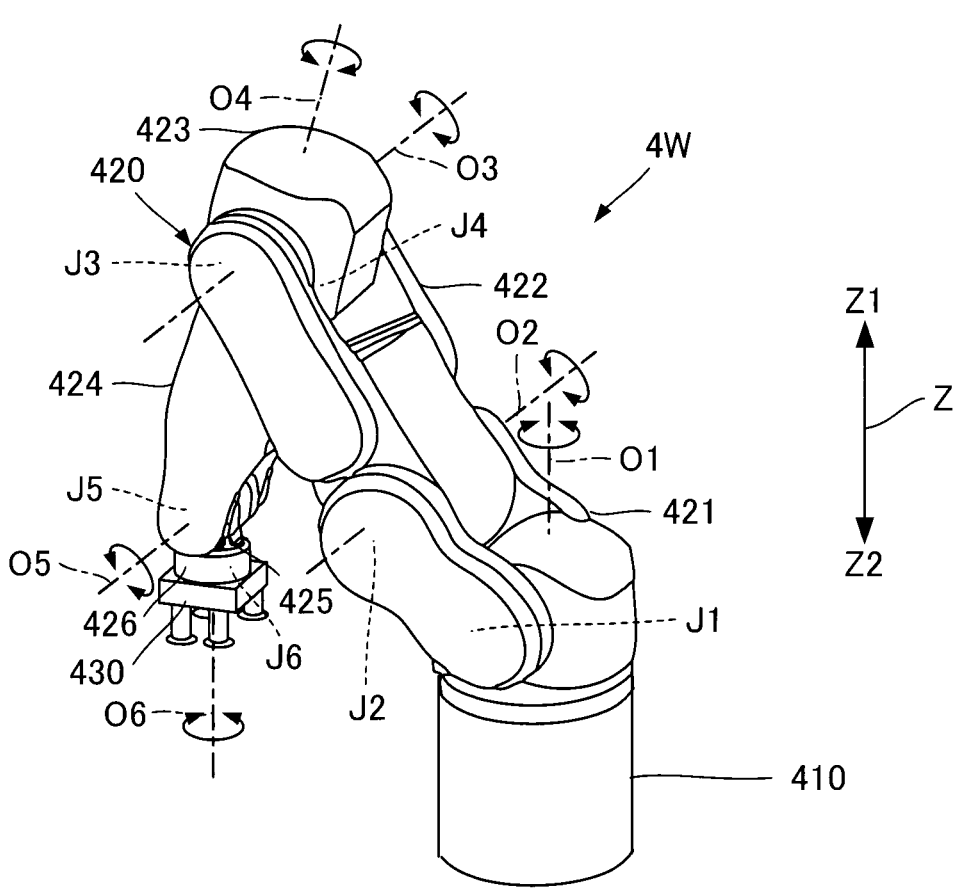
FIG. 3 is a perspective view illustrating an example of an articulated robot.

FIG. 3 is a perspective view illustrating an example of the articulated robot 4W. Hereinafter, a configuration of the articulated robot 4W will be described with reference to FIG. 3. In the example illustrated in FIG. 3, the articulated robot 4W is a 6-axis articulated robot.

As illustrated in FIG. 3, the articulated robot 4W has a base portion 410 and an arm 420.

The base portion 410 is a base that supports the arm 420. In the example illustrated in FIG. 3, the base portion 410 is fixed to the stage 4*d* of the Y movement mechanism 4Y described above by screwing or the like.

The arm 420 is a 6-axis robot arm having a base end attached to the base portion 410 and a tip of which a position and a posture are three-dimensionally changed with respect to the base end. Specifically, the arm 420 has arms 421, 422, 423, 424, 425, and 426, and the arms are coupled in this order from the base portion 410.

The arm 421 is rotatably coupled to the base portion 410 around a rotation axis O1 via a joint J1. The arm 422 is rotatably coupled to the arm 421 around a rotation axis O2 via a joint J2. The arm 423 is rotatably coupled to the arm 422 around a rotation axis O3 via a joint J3. The arm 424 is rotatably coupled to the arm 423 around a rotation axis O4 via a joint J4. The arm 425 is rotatably coupled to the arm 424 around a rotation axis O5 via a joint J5. The arm 426 is rotatably coupled to the arm 425 around a rotation axis O6 via a joint J6. Here, the joint J6 is an example of a "first joint", and the joint J5 is an example of a "second joint".

Each of the joints J1 to J6 is a mechanism for rotatably coupling one of two adjacent members among the base portion 410 and the arms 421 to 426 to the other. Although not illustrated in FIG. 3, each of the joints J1 to J6 is provided with a drive mechanism for rotating one of the two adjacent members with respect to the other. The drive mechanism includes, for example, a motor that generates a drive force for the rotation, a speed reducer that decelerates and outputs the drive force, an encoder such as a rotary encoder that measures the operation amount such as an angle of the rotation, and the like.

The rotation axis O1 is an axis parallel to the Z-axis. The rotation axis O2 is an axis perpendicular to the rotation axis O1. The rotation axis O3 is an axis parallel with the rotation axis O2. The rotation axis O4 is an axis perpendicular to the rotation axis O3. The rotation axis O5 is an axis perpendicular to the rotation axis O4. The rotation axis O6 is an axis perpendicular to the rotation axis O5.

Regarding these rotation axes, "perpendicular" includes not only when an angle formed by the two rotation axes is strictly 90°, but also when the angle formed by the two rotation axes deviates within a range of approximately 90° to ±5°. In the same manner, "parallel" includes not only when the two rotation axes are strictly parallel with each other, but also when one of the two rotation axes is inclined within a range of approximately ±5° with respect to the other.

A hand mechanism 430 is mounted on the above articulated robot 4W as an end effector.

The hand mechanism 430 is a robot hand that holds the workpiece W to be attachable and detachable. Here, "holding" is a concept including both sucking and gripping. In the example illustrated in FIG. 1, the hand mechanism 430 sucks the workpiece W by using a negative pressure. A configuration of the hand mechanism 430 is appropriately determined depending on a shape, a size, a material, and the like of the workpiece W. The hand mechanism 430 is not limited to a suction mechanism using the negative pressure, and may be, for example, a gripping hand mechanism.

1-4. Configuration of Head Unit

Figure 4:
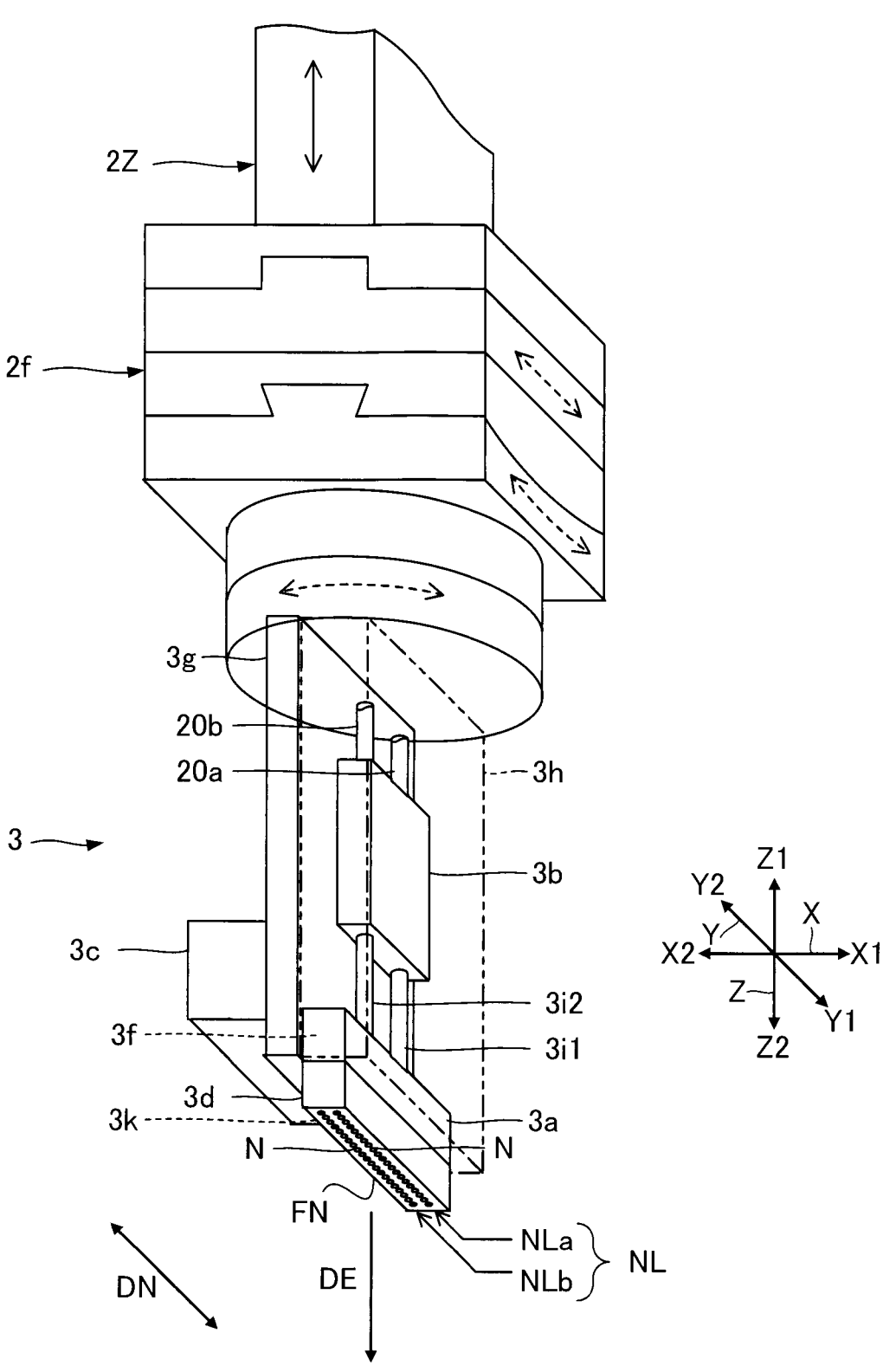
FIG. 4 is a perspective view illustrating a schematic configuration of a head unit and an adjustment mechanism.

FIG. 4 is a perspective view illustrating a schematic configuration of the head unit 3 and an adjustment mechanism 2*f*. The adjustment mechanism 2*f* is a mechanism for finely adjusting a positional relationship between the Z movement mechanism 2Z and the head unit 3 in a direction along the Y-axis, a positional relationship between the Z movement mechanism 2Z and the head unit 3 around an axis parallel to the X-axis, and a positional relationship between the Z movement mechanism 2Z and the head unit 3 around an axis parallel to the Z-axis. Although not illustrated, the adjustment mechanism 2*f* is provided with knobs and the like for the fine adjustment, and each positional relationship can be manually and finely adjusted. The adjustment mechanism 2*f* may be provided as needed, or may be omitted.

In addition to the head 3*a*, the head unit 3 has a flow path structure 3*b*, the energy emitting portion 3*c*, a support body 3*g*, and a cover 3*h*. Among the elements constituting the head unit 3, the elements other than the support body 3*g* are directly or indirectly supported by the support body 3*g*. In the example illustrated in FIG. 4, the number of each of the head 3*a* and the flow path structure 3*b* included in the head unit 3 is one. Meanwhile, the number is not limited to the example illustrated in FIG. 4, and may be equal to or more than 2. Further, the flow path structure 3*b* may be provided outside the head unit 3. The components of the head unit 3 are not limited to the example illustrated in FIG. 4, and may include, for example, a heater, a temperature sensor, and the like.

The support body 3*g* is mounted on the Z movement mechanism 2Z via the adjustment mechanism 2*f* described above. Therefore, the head 3*a*, the flow path structure 3*b*, and the energy emitting portion 3*c* are collectively supported to the Z movement mechanism 2Z by the support body 3*g*.

The support body 3*g* is a substantially rigid body, and is made of, for example, a metal material or the like. In FIG. 4, the support body 3*g* has a plate shape, and a shape of the support body 3*g* is not particularly limited and is selected in any manner. Further, the support body 3*g* may be configured with a plurality of members.

The head 3*a*, the flow path structure 3*b*, and the cover 3*h* are disposed at positions in the X1 direction with respect to the support body 3*g* described above. These are fixed to the support body 3*g* by screwing or the like. The head 3*a* has a nozzle surface FN and the plurality of nozzles N that are opened on the nozzle surface FN. Here, the nozzle N of the head 3*a*_1 to be described below, which is the head 3*a* of the head unit 3_1, is an example of a "first nozzle". The nozzle N of the head 3*a*_2 to be described below, which is the head 3*a* of the head unit 3_2, is an example of a "second nozzle".

In the example illustrated in FIG. 4, a normal direction of the nozzle surface FN is the Z2 direction, and the plurality of nozzles N are divided into a nozzle array NLa and a nozzle array NLb which are arranged at intervals in the direction along the X-axis. Each of the nozzle array NLa and the nozzle array NLb is a set of the plurality of nozzles N linearly arrayed in a nozzle array direction DN which is a direction along the Y-axis. Here, an element related to each nozzle N of the nozzle array NLa and an element related to each nozzle N of the nozzle array NLb in the head 3*a* are configured to be substantially symmetrical with each other in a direction along the X-axis. Hereinafter, a set of the nozzle array NLa and the nozzle array NLb may be referred to as a nozzle array NL. The individual nozzle N ejects an ink along a parallel ejection direction DE. Under ideal conditions, the Z2 direction and the ejection direction DE are equal directions.

Although not illustrated, the head 3*a* has a piezoelectric element which is a drive element and a cavity for accommodating inks, for each nozzle N. Here, the piezoelectric element ejects the ink from a nozzle corresponding to the cavity by changing a pressure of the cavity corresponding to the piezoelectric element. Such a head 3*a* can be obtained, for example, by bonding a plurality of substrates such as a silicon substrate appropriately processed by etching or the like with an adhesive or the like. As the drive element for ejecting the ink from the nozzle, a heater that heats the ink in the cavity may be used, instead of the piezoelectric element.

The above head 3*a* is coupled to a supply pipe 20*a* and a discharge pipe 20*b* via the flow path structure 3*b*. The supply pipe 20*a* is a flexible pipe body that supplies inks from an ink tank (not illustrated) to the head unit 3. The discharge pipe 20*b* is a flexible pipe body for transferring the ink to a circulation mechanism or a discharge mechanism (not illustrated).

The flow path structure 3*b* is disposed at a position in the Z1 direction from the head 3*a*. Further, the flow path structure 3*b* is coupled to the head 3*a* via a supply pipe 3*i*1 and a discharge pipe 312. The supply pipe 3*i*1 is a pipe body for supplying the ink from the flow path structure 3*b* to the head 3*a*. The discharge pipe 312 is a pipe body for introducing the ink ejected from the head 3*a* into the flow path structure 3*b*.

The flow path structure 3*b* is a valve mechanism that is opened and closed according to a pressure of the ink in the head 3*a*. By this opening and closing, the pressure of the ink in the head 3*a* is maintained at a negative pressure within a predetermined range even when a positional relationship between the head 3*a* and the ink tank (not illustrated) described above is changed.

The cover 3*h* is a box-shaped member that covers the periphery of the flow path structure 3*b*, and is made of, for example, a metal material or the like. The cover 3*h* forms a space for accommodating the flow path structure 3*b* between the cover 3*h* and the support body 3*g*. The space may be sealed or opened to the outside.

The energy emitting portion 3*c* is disposed at a position in the X2 direction from the support body 3*g*. The energy emitting portion 3*c* emits energy such as light, heat, an electron beam, or radiation for curing or solidifying the ink on the workpiece W. For example, when the ink has ultraviolet curability, the energy emitting portion 3*c* is configured with a light emitting element such as a light emitting diode (LED) that emits ultraviolet rays. Further, the energy emitting portion 3*c* may appropriately have an optical component such as a lens for adjusting an emitting direction or an emitting range of the energy.

Here, the energy emitting portion 3*c* emits energy such as light, heat, an electron beam, or radiation for semi-curing or semi-solidifying the ink on the workpiece W. The term "semi-curing" means a state where the ink is partially cured without being completely cured. In the same manner, the term "semi-solidifying" means a state where the ink is partially solidified without being completely solidified. The energy emitting portion 3*c* may be provided as needed, or may be omitted. Further, the energy emitting portion 3*c* may completely cure the inks on the workpiece W, in the same manner as the energy emitting portion 32 to be described below.

1-5. Printing Operation

Figure 5:
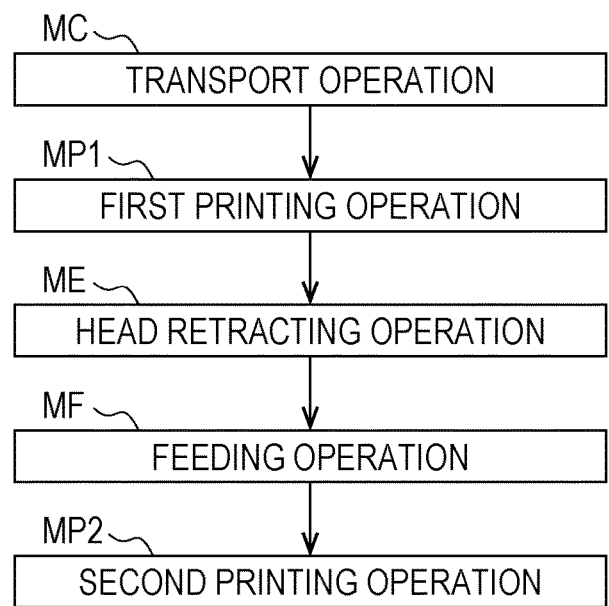
FIG. 5 is a diagram illustrating a flow of an operation of the three-dimensional object printing apparatus according to the first embodiment.

FIG. 5 is a diagram illustrating a flow of an operation of the three-dimensional object printing apparatus 1 according to the first embodiment. The operation flow of the three-dimensional object printing apparatus 1 is also represented as a printing method using the three-dimensional object printing apparatus 1. As illustrated in FIG. 5, the three-dimensional object printing apparatus 1 executes a transport operation MC, a first printing operation MP1, a head retracting operation ME, a feeding operation MF, and a second printing operation MP2 in this order. First, an overview of these operations will be described below.

In the transport operation MC, the articulated robot 4W transports the workpiece W. For example, in the transport operation MC, the articulated robot 4W transports the workpiece W to a position at which inks ejected from the heads 3*a*_1 to 3*a*_4 land in a first printing region RP1 to be described below on the workpiece W.

In the first printing operation MP1, the inks are continuously ejected from the heads 3*a*_1 to 3*a*_4 toward the first printing region RP1 to be described below on the workpiece W while operating the Z movement mechanisms 2Z_1 to 2Z_4 and the X movement mechanism 2X. Thus, printing is performed in the first printing region RP1. Here, the articulated robot 4W does not operate. Thus, since a posture of the workpiece W is stabilized, a decrease in image quality due to the operation of the articulated robot 4W is prevented.

In the head retracting operation ME, the heads 3*a*_1 to 3*a*_4 are moved in a direction away from the workpiece W by an operation of the Z movement mechanisms 2Z_1 to 2Z_4. That is, in the head retracting operation ME, the heads 3*a*_1 to 3*a*_4 are moved in the Z1 direction from the position during the execution of the first printing operation by the operation of the Z movement mechanisms 2Z_1 to 2Z_4. Thus, contact between the heads 3*a*_1 to 3*a*_4 and the workpiece W when the feeding operation MF is executed is prevented. Here, the articulated robot 4W does not operate. Thus, a position and a posture of the workpiece W are not changed from the first printing operation MP1 by the articulated robot 4W.

The feeding operation MF moves the workpiece W in a direction along the Y-axis by operating the Y movement mechanism 4Y without operating the articulated robot 4W. Thus, a region as a printing target on the workpiece W is changed from the first printing region RP1 to a second printing region RP2 to be described below. That is, when each of the first printing region RP1 and the second printing region RP2 is regarded as one "line", the feeding operation MF is an operation corresponding to a line feed. Here, the articulated robot 4W does not operate. Thus, a position and a posture of the workpiece W are not changed from the first printing operation MP1. That is, since the articulated robot 4W does not operate over a period from the execution of the first printing operation MP1 to the execution of the second printing operation MP2, a deviation of the printing position with respect to the workpiece W, which will be described below, is reduced.

In the second printing operation MP2, while operating the Z movement mechanisms 2Z_1 to 2Z_4 and the X movement mechanism 2X, the inks are continuously ejected from the heads 3a_1 to 3a_4 toward the second printing region RP2 adjacent to the first printing region RP1 on the workpiece W. Thus, printing is performed in the second printing region RP2. Here, the articulated robot 4W does not operate. Thus, since a posture of the workpiece W is stabilized, a decrease in image quality due to the operation of the articulated robot 4W is prevented.

Figure 6:
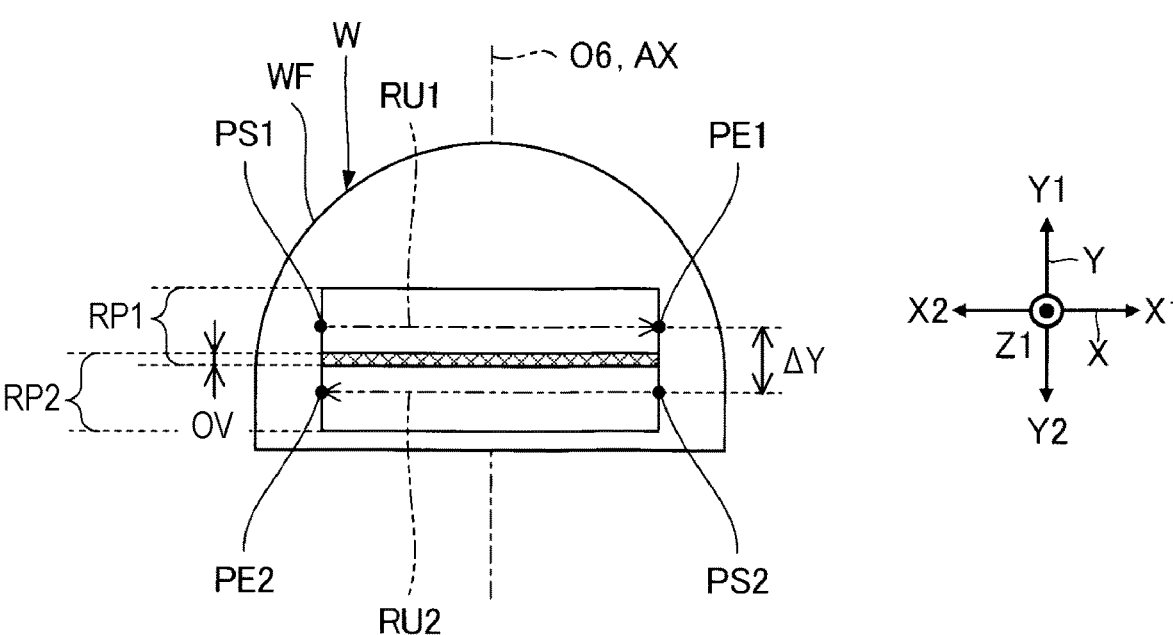
FIG. 6 is a diagram describing a first printing region and a second printing region.

FIG. 6 is a diagram describing the first printing region RP1 and the second printing region RP2. FIG. 6 illustrates a case where the first printing region RP1 and the second printing region RP2 are set on a side surface around a central axis AX of the workpiece W. Here, the workpiece W, which is a substantially hemispherical body, is a rotator around the central axis AX. Further, FIG. 6 illustrates a case where the central axis AX of the workpiece W coincides with the rotation axis O6 of the articulated robot 4W.

When the first printing operation MP1 is executed, printing is performed in the first printing region RP1 on the workpiece W as illustrated in FIG. 6. Here, an ink ejected from the head 3a moving from a start point PS1 to an end point PE1 along the movement path RU1 by the operation of the X movement mechanism 2X is applied to the first printing region RP1. The movement path RU1 is a path extending parallel to the X-axis when viewed in a direction along the Z-axis. In the example illustrated in FIG. 6, a direction of the movement path RU1 is the X1 direction.

On the other hand, when the second printing operation MP2 is executed, printing is performed in the second printing region RP2 different from the first printing region RP1 on the workpiece W. Here, the ink ejected from the head 3a moving from a start point PS2 to an end point PE2 along the movement path RU2 by the operation of the X movement mechanism 2X is applied to the second printing region RP2. The movement path RU2 is a path extending parallel to the X-axis when viewed in the direction along the Z-axis. In the example illustrated in FIG. 6, a direction of the movement path RU2 is the X2 direction. The direction of the movement path RU2 may be the X1 direction.

Parts of the first printing region RP1 and the second printing region RP2 overlap with each other in an overlapping region OV. That is, each of the first printing region RP1 and the second printing region RP2 shares the overlapping region OV. Further, the other part of the first printing region RP1 other than the overlapping region OV does not overlap with the second printing region RP2. In the same manner, the other part of the second printing region RP2 other than the overlapping region OV does not overlap with the first printing region RP1.

Here, one image is printed by printing by the first printing operation MP1 and the second printing operation MP2. That is, one image is printed by a plurality of printing paths including a printing path by the first printing operation MP1 and a printing path by the second printing operation MP2. The "printing path" means a series of printing operations in which ejection of inks by the head 3a is executed while moving the head 3a along the movement path without including the feeding operation MF of shifting a relative position between the head 3a and the workpiece W along the Y-axis and a return operation of switching the movement direction of the head 3a to an opposite direction.

In such printing by the plurality of printing paths, an influence on an image quality deterioration is more than when a single path is used. In particular, when the overlapping region OV is provided as described above and a printing position with respect to the workpiece W is shifted when the printing path is changed, the image quality significantly deteriorates in the overlapping region OV.

Therefore, in order to reduce the deviation of the printing position with respect to the workpiece W, in the three-dimensional object printing apparatus 1, the Y movement mechanism 4Y is used to change a positional relationship between the workpiece W and the head 3a in the direction along the Y-axis, in the feeding operation MF to be described below.

Figure 7:
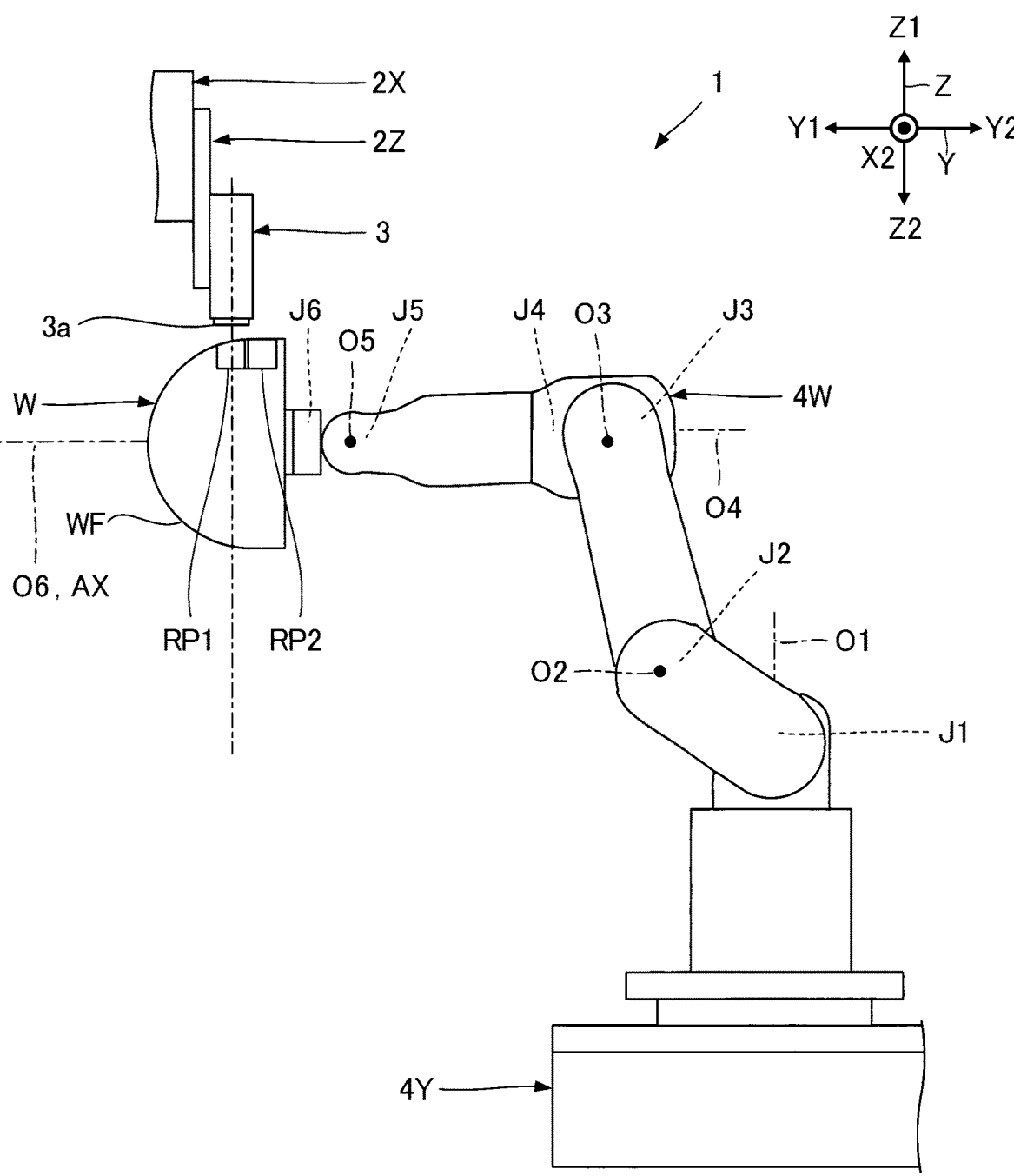
FIG. 7 is a diagram describing a first printing operation according to the first embodiment.

FIG. 7 is a diagram describing the first printing operation MP1 according to the first embodiment. The articulated robot 4W during execution of the first printing operation MP1 supports the workpiece W such that the first printing region RP1 is located immediately below the head 3a.

In the example illustrated in FIG. 7, each of the rotation axes O2, O3, and O5 of the articulated robot 4W is parallel to the X-axis, and each of the rotation axes O4 and O6 is parallel to the Y-axis. As described above, since the central axis AX of the workpiece W which is a rotator coincides with the rotation axis O6, the central axis AX is also parallel to the Y-axis. Therefore, both the first printing region RP1 and the second printing region RP2 are disposed along the nozzle surface FN of the head 3a as much as possible.

Figure 8:
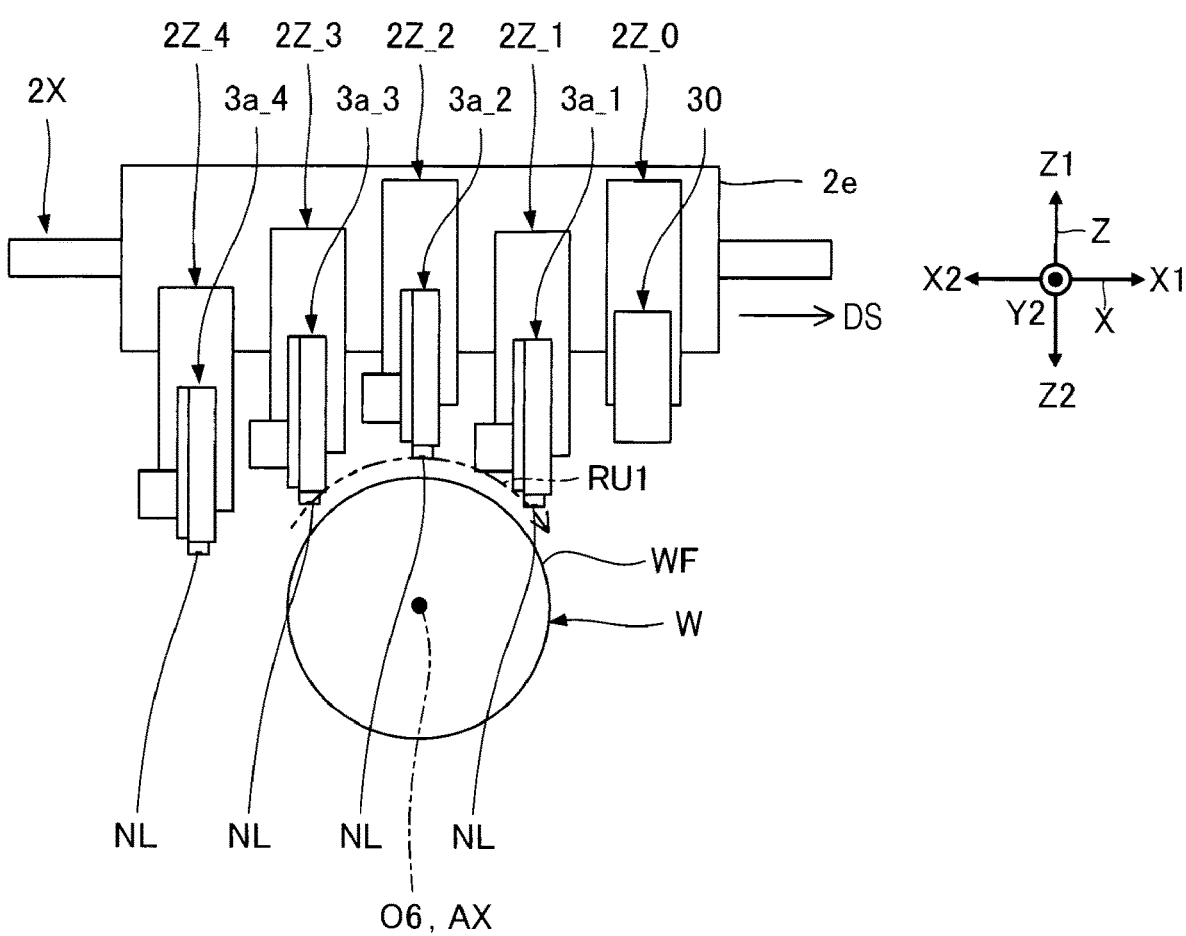
FIG. 8 is a diagram illustrating an X movement mechanism and a Z movement mechanism when the first printing operation according to the first embodiment is executed.

FIG. 8 is a diagram describing the X movement mechanism 2X and the Z movement mechanism 2Z when the first printing operation MP1 according to the first embodiment is executed. In FIG. 8, a state of the heads 3a_1 to 3a_4 during the execution of the first printing operation MP1 is illustrated, and the arm 420 and the like of the articulated robot 4W are not illustrated. The head 3a_1 is the head 3a included in the head unit 3_1, the head 3a_2 is the head 3a included in the head unit 3_2, the head 3a_3 is the head 3a included in the head unit 3_3, and the head 3a_4 is the head 3a included in the head unit 3_4. Meanwhile, in the following, the heads 3a_1 to 3a_4 may be referred to as the heads 3a without distinguishing the heads 3a_1 to 3a_4.

As illustrated in FIG. 8, in the first printing operation MP1, the heads 3a_1 to 3a_4 eject inks toward the surface WF based on print data while the X movement mechanism 2X moves the heads 3a_1 to 3a_4 and the sensor unit 30 in the movement direction DS which is the X1 direction, and the Z movement mechanisms 2Z_1 to 2Z_4 move the heads 3a_1 to 3a_4 along the Z-axis to follow the surface WF of the workpiece W.

Here, the movement path RU1 of the heads 3a_1 to 3a_4 in the first printing operation MP1 is defined by a position indicated by the path information Da described above. Further, the movement path RU1 is set such that distances between the nozzles N of the heads 3a_1 to 3a_4 and the workpiece W in the direction along the Z-axis are constant, for example. At least a part of the movement path RU1 may be set to change the distances between the nozzles N of the heads 3a_1 to 3a_4 and the workpiece W in the direction along the Z-axis. The movement path of the sensor unit 30 is not particularly limited, and is, for example, a path which is retracted in the Z1 direction from the movement path RU1. The sensor unit 30 may be operated, as needed, during the execution of the first printing operation MP1.

When a start instruction of the first printing operation MP1 is given, the heads 3a of the heads 3a_1 to 3_4 move in the X1 direction from a state of being located in a region in the X2 direction with respect to the surface WF of the workpiece W by the operation of the X movement mechanism 2X. Here, as described above, since the head units 3_1 to 3_4 are arranged in the X2 direction in this order, the heads 3a_1 to 3a_4 are moved with the head 3a_1 as a head in the X1 direction until the head 3a_4 at an end passes over the surface WF. Here, the heads 3a_1 to 3a_4 sequentially overlap with the surface WF of the workpiece W when viewed in the direction along the Z-axis, and then eject the inks toward the first printing region RP1 of the surface WF while moving along the Z-axis to follow the surface WF of the workpiece W by the operation of the Z movement mechanisms 2Z_1 to 2Z_4. Here, the articulated robot 4W does not operate during the execution of the first printing operation MP1. Thus, the position and the posture of the workpiece W during the execution of the first printing operation MP1 are stabilized.

As described above, the three-dimensional object printing apparatus 1 executes the first printing operation MP1. Here, the articulated robot 4W does not operate during the execution of the first printing operation MP1. In this manner, by performing the first printing operation MP1 while preventing the vibration or the speed fluctuation due to the operation of the articulated robot 4W, it is possible to reduce the deterioration in image quality of the printing. Here, since the operation of the articulated robot 4W is a combination of the rotational operations of a plurality of joints J, the vibration or the speed fluctuation is likely to occur, whereas the operation of the Z movement mechanism 2Z and the X movement mechanism 2X is a simple linear operation, and thus it is easy to improve operation accuracy. Therefore, by performing the printing operation by the operation of the Z movement mechanism 2Z and the X movement mechanism 2X while stopping the operation of the articulated robot 4W, the deterioration in image quality is reduced.

Figure 9:
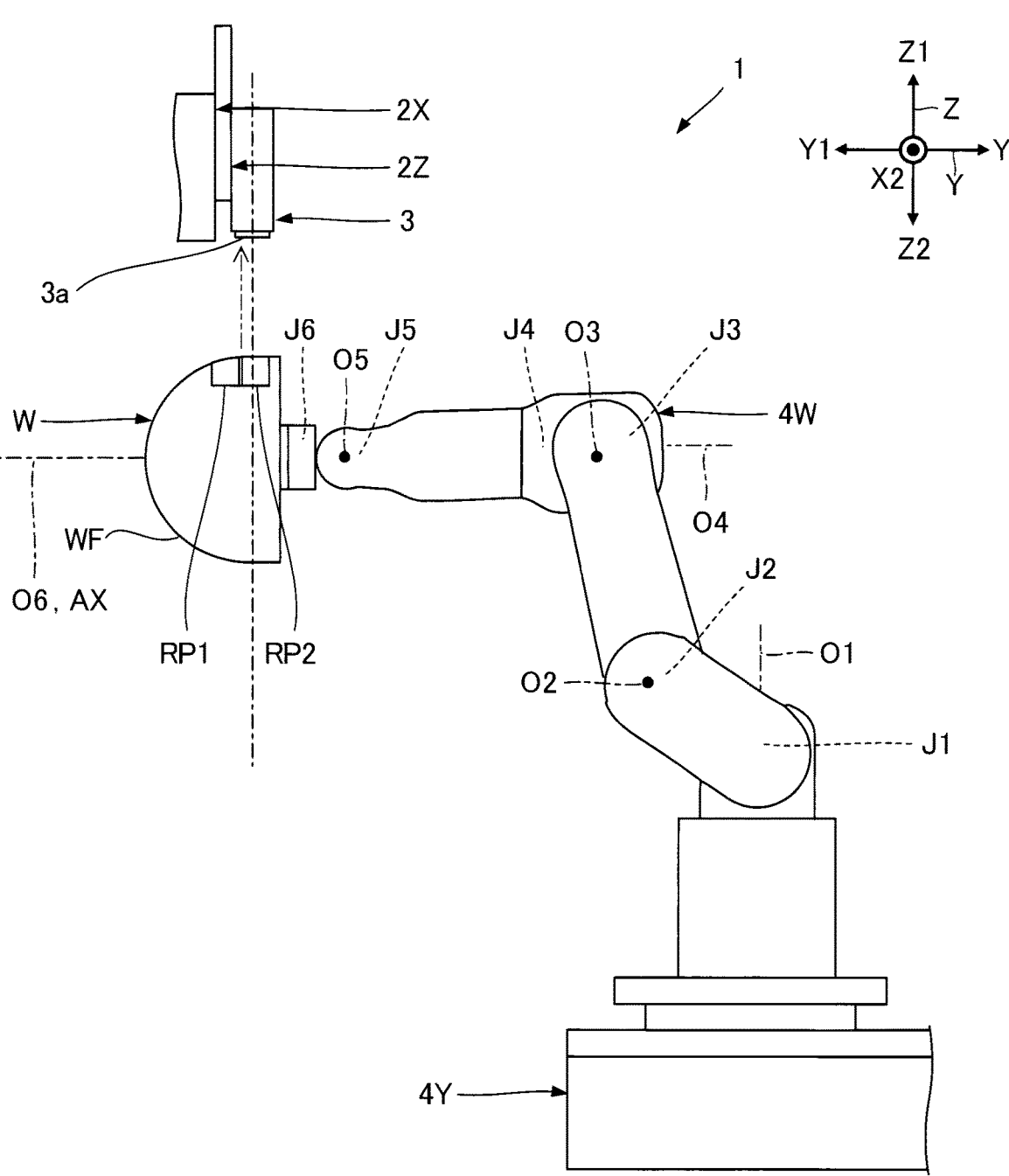
FIG. 9 is a diagram describing a head retracting operation and a feeding operation according to the first embodiment.

FIG. 9 is a diagram describing the head retracting operation ME and the feeding operation MF according to the first embodiment. In the head retracting operation ME of the present embodiment, as illustrated in FIG. 9, the head 3a moves in a direction away from the workpiece W in a period between the first printing operation MP1 and the feeding operation MF, by the operation of the Z movement mechanism 2Z. In the present embodiment, the head 3a is moved in the Z1 direction from a position during the execution of the first printing operation by the operation of the Z movement mechanisms 2Z_1 to 2Z_4. That is, the head 3a rises. Therefore, the head 3a can be retracted with respect to the workpiece W during the execution of the feeding operation MF. As a result, the head 3a is prevented from coming into contact with the workpiece W during the execution of the feeding operation MF. Here, a retracting distance of the head 3a with respect to the workpiece W is not particularly limited, and is, for example, approximately several centimeters to tens of centimeters. When the head 3a can be moved in a direction sufficiently away from the workpiece W by the operation of the X movement mechanism 2X, the head 3a may be retracted from the workpiece W by the operation of the X movement mechanism 2X without operating the Z movement mechanism 2Z. In addition, in the same manner as in Modification Example 1 to be described below, the head retracting operation ME may be executed by the operation of the Y movement mechanism 4Y.

In the feeding operation MF, without operating the articulated robot 4W, the Y movement mechanism 4Y operates such that the second printing region RP2 of the workpiece W can be located immediately below the head 3a at a time of execution of the second printing operation MP2. Here, a movement distance of the workpiece W is a distance ΔY illustrated in FIG. 6 described above.

In the example illustrated in FIG. 9, each of the rotation axes O2, O3, and O5 of the articulated robot 4W is parallel to the X-axis and each of the rotation axes O4 and O6 is parallel to the Y-axis, over the execution period of the feeding operation MF. As described above, since the central axis AX of the workpiece W which is a rotator coincides with the rotation axis O6, the central axis AX is also parallel to the Y-axis.

As described above, in the feeding operation MF, the Y movement mechanism 4Y operates and the articulated robot 4W does not operate, in a period between the first printing operation MP1 and the second printing operation MP2. In this manner, in a period between a printing path by the first printing operation MP1 and a printing path by the second printing operation MP2, in a state where the operation of the articulated robot 4W is stopped, the feeding operation MF can be executed by the operation of the Y movement mechanism 4Y. Here, since the operation of the articulated robot 4W is a combination of a plurality of rotational operations, the vibration or the speed fluctuation is likely to occur, whereas the operation of the Y movement mechanism 4Y is a simple linear operation, and thus it is easy to improve the operation accuracy. Therefore, by performing the feeding operation MF by the operation of the Y movement mechanism 4Y while stopping the operation of the articulated robot 4W, it is possible to reduce a positional deviation between the printing paths in the continuous printing images.

In particular, as described above, when a part of the first printing region RP1 overlaps with the second printing region RP2 and the other part of the first printing region RP1 does not overlap with the second printing region RP2, when positioning accuracy between these regions is low, the image quality significantly deteriorates. Therefore, in this case, the effect of executing the feeding operation MF for moving the workpiece W with high accuracy along the Y-axis without operating the articulated robot 4W is remarkable.

Figure 10:
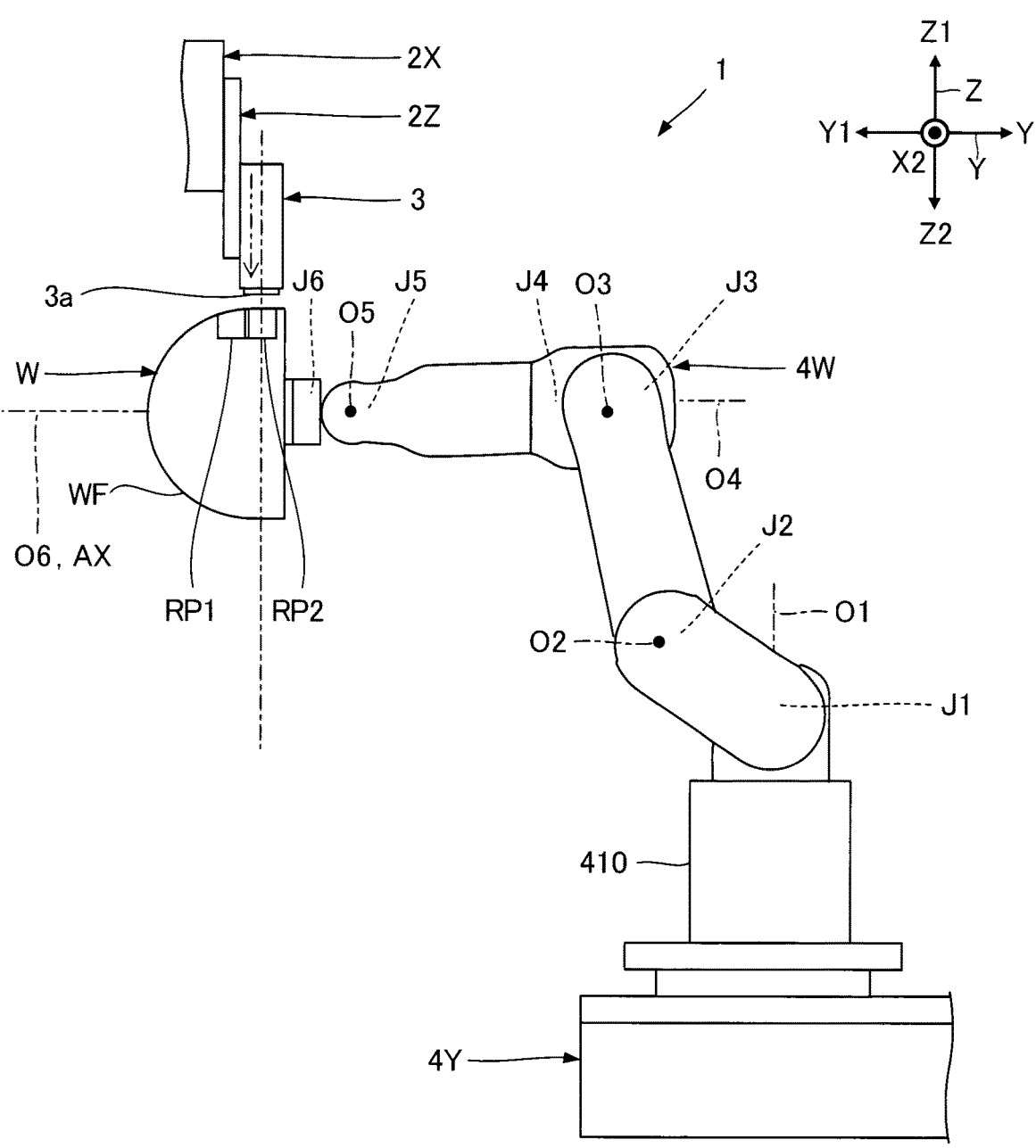
FIG. 10 is a diagram describing a second printing operation according to the first embodiment.

FIG. 10 is a diagram illustrating the second printing operation MP2 according to the first embodiment. During execution of the second printing operation MP2, the articulated robot 4W supports the workpiece W such that the second printing region RP2 is located immediately below the head 3a.

In the example illustrated in FIG. 10, each of the rotation axes O2, O3, and O5 of the articulated robot 4W is parallel to the X-axis, and each of the rotation axes O4 and O6 is parallel to the Y-axis. As described above, since the central axis AX of the workpiece W which is a rotator coincides with the rotation axis O6, the central axis AX is also parallel to the Y-axis.

In the second printing operation MP2, in the same manner as the first printing operation MP1, the heads 3a_1 to 3a_4 eject the inks toward the second printing region RP2 of the surface WF based on the print data while the X movement mechanism 2X moves the heads 3a_1 to 3a_4 and the sensor unit 30 along the X-axis and the Z movement mechanisms 2Z_1 to 2Z_4 move the heads 3a_1 to 3a_4 along the Z-axis to follow the surface WF of the workpiece W. Here, the articulated robot 4W does not operate during the execution of the second printing operation MP2. Thus, the position and the posture of the workpiece W during the execution of the second printing operation MP2 are stabilized.

Here, the movement path RU2 of the heads 3a_1 to 3a_4 in the second printing operation MP2 may be the same as or different from the movement path RU1 of the heads 3*a*_1 to 3*a*_4 in the first printing operation MP1.

With the operation of the above three-dimensional object printing apparatus 1, that is, the printing method using the three-dimensional object printing apparatus 1, the printing can be performed on the first printing region RP1 and the second printing region RP2 of the workpiece W.

With the above first embodiment, the articulated robot 4W supports the workpiece W, and thus the workpiece W can be installed in a desired posture with respect to the heads 3*a*_1 to 3*a*_4, regardless of the three-dimensional shape of the workpiece W. Therefore, while operating the Z movement mechanisms 2Z_1 to 2Z_4 and the X movement mechanism 2X, the inks can be ejected from the heads 3*a*_1 to 3*a*_4 toward the first printing region RP1 and the second printing region RP2 on the workpiece W with high accuracy. In this manner, printing with high accuracy can be performed on the three-dimensional workpiece W while the workpiece W is easily installed.

In the present embodiment, in a period between a printing path by the first printing operation MP1 and a printing path by the second printing operation MP2, in a state where the operation of the articulated robot 4W is stopped, the feeding operation MF is executed by the operation of the Y movement mechanism 4Y, so that it is possible to reduce a positional deviation between the printing paths in the continuous printing images.

2. Second Embodiment

Hereinafter, a second embodiment of the present disclosure will be described. In the embodiment described below as an example, the reference numerals used in the description of the first embodiment will be assigned to elements having the same effects and functions as those of the first embodiment, and each detailed description thereof will be appropriately omitted.

A three-dimensional object printing apparatus 1A described below according to the present embodiment is configured in the same manner as the three-dimensional object printing apparatus 1 according to the first embodiment described above, except that an operation is different. In the present embodiment, when the feeding operation MF and the second printing operation MP2 of the first embodiment are not performed, the Y movement mechanism 4Y may be omitted.

Figure 11:
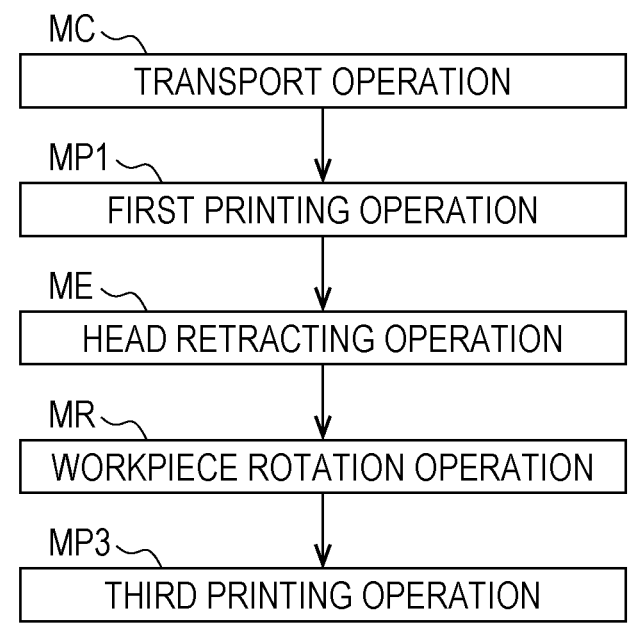
FIG. 11 is a diagram illustrating a flow of an operation of a three-dimensional object printing apparatus according to a second embodiment.

FIG. 11 is a diagram illustrating a flow of an operation of the three-dimensional object printing apparatus 1A according to the second embodiment. The flow of the operation of the three-dimensional object printing apparatus 1A is also represented as a printing method using the three-dimensional object printing apparatus 1A. As illustrated in FIG. 11, the three-dimensional object printing apparatus 1A executes the transport operation MC, the first printing operation MP1, the head retracting operation ME, a workpiece rotation operation MR, and a third printing operation MP3 in this order. Each of the transport operation MC, the first printing operation MP1, and the head retracting operation ME of the present embodiment has the same manner as the first embodiment.

In the workpiece rotation operation MR, a posture of the workpiece W is changed by operating the articulated robot 4W. Thus, a region of the workpiece W, which is a printing target, is changed.

In the third printing operation MP3, while operating the Z movement mechanisms 2Z_1 to 2Z_4 and the X movement mechanism 2X, inks are ejected from the heads 3*a*_1 to 3*a*_4 toward a third printing region RP3 different from the first printing region RP1 on the workpiece W. Thus, printing is performed in the third printing region RP3. Here, the articulated robot 4W does not operate. Thus, since a posture of the workpiece W is stabilized, a decrease in image quality due to the operation of the articulated robot 4W is prevented.

Figure 12:
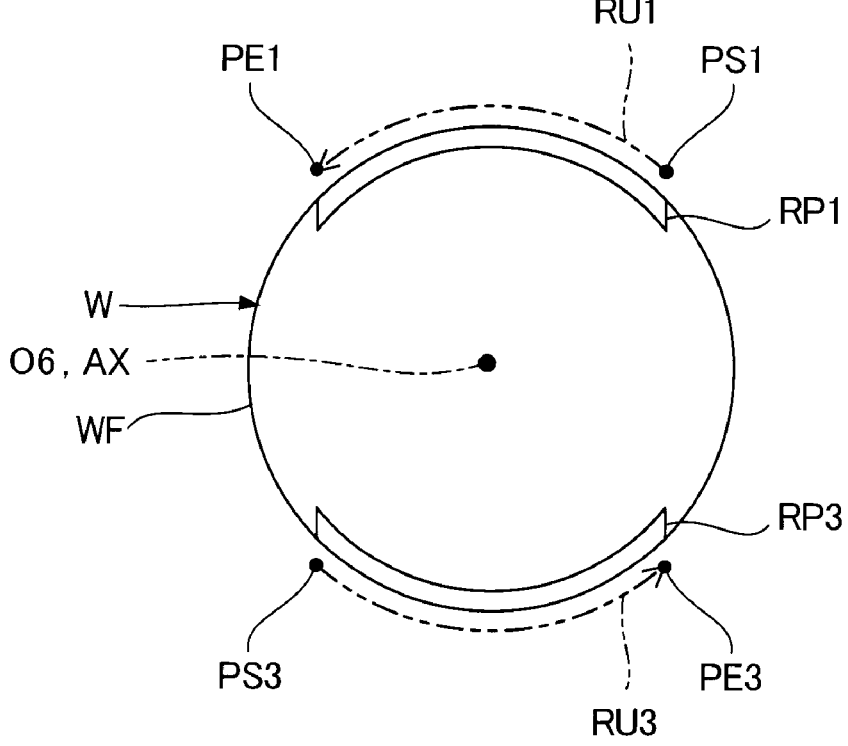
FIG. 12 is a diagram describing the first printing region and a third printing region.

FIG. 12 is a diagram describing the first printing region RP1 and the third printing region RP3. FIG. 12 illustrates a case where the first printing region RP1 and the third printing region RP3 are set at positions having different circumferential directions on a side surface around the central axis AX of the workpiece W. Further, FIG. 6 illustrates a case where the central axis AX of the workpiece W coincides with the rotation axis O6 of the articulated robot 4W. The first printing region RP1 of the present embodiment is the same as the first printing region RP1 of the first embodiment described above.

When the third printing operation MP3 is executed, printing is performed in the third printing region RP3 different from the first printing region RP1 on the workpiece W. In the example illustrated in FIG. 12, the third printing region RP3 is at a position different from the first printing region RP1 by 180° around the central axis AX. Meanwhile, at least parts of the first printing region RP1 and the third printing region RP3 overlap with each other in a direction along the central axis AX.

The ink ejected from the head 3*a* moving from a start point PS3 to an end point PE3 along a movement path RU3 by the operation of the X movement mechanism 2X is applied to the third printing region RP3. The movement path RU3 is a path extending parallel to the X-axis when viewed in the direction along the Z-axis. FIG. 12 illustrates the movement path RU3 when viewed from the workpiece W. Meanwhile, in an actual space, since the third printing operation MP3 is executed after the workpiece rotation operation MR is executed, the movement path RU3 substantially coincides with the movement path RU1. A direction of the movement path RU3 may be the same as or different from the direction of the movement path RU1.

Figure 13:
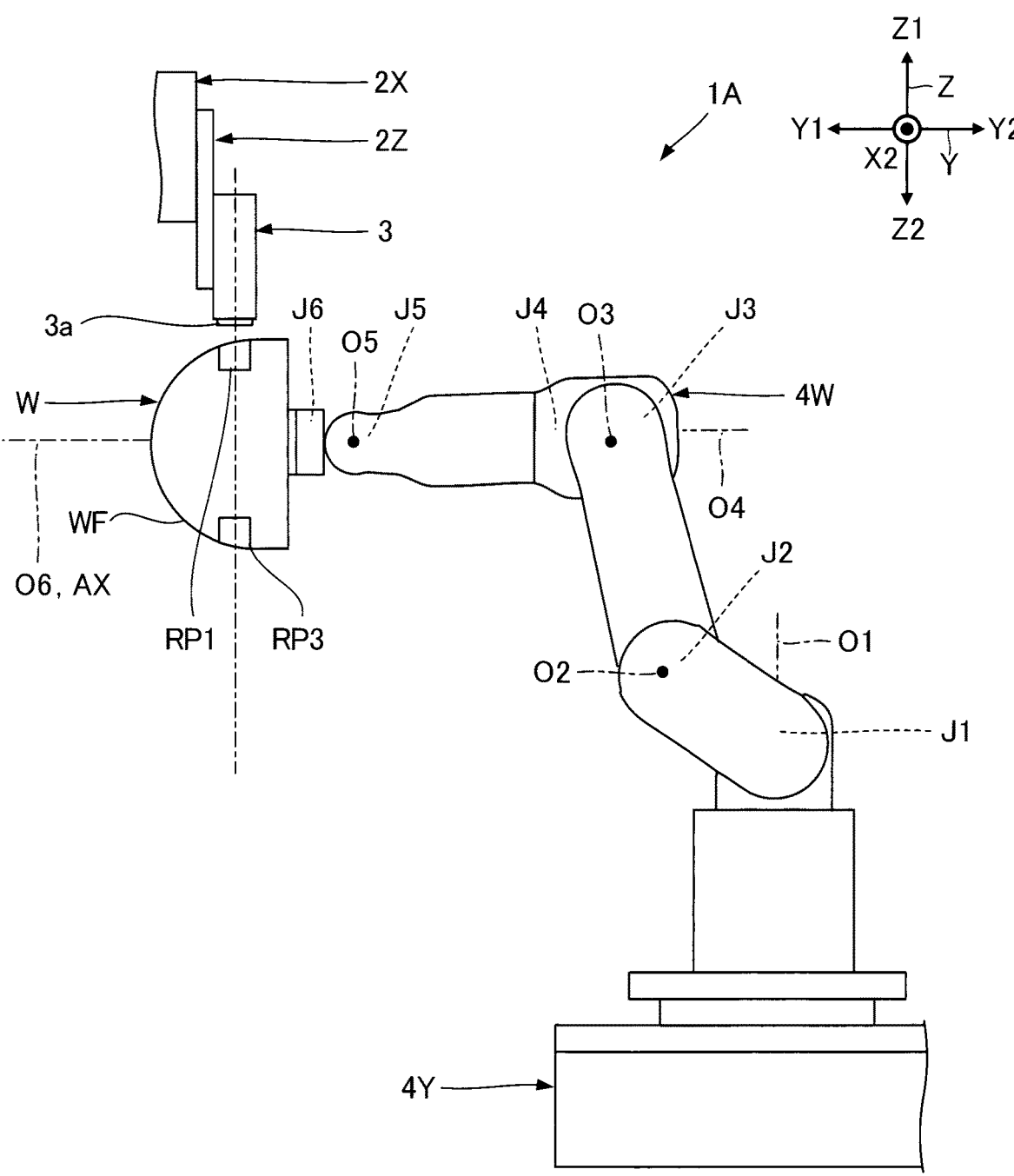
FIG. 13 is a diagram describing a first printing operation according to the second embodiment.

FIG. 13 is a diagram describing the first printing operation MP1 according to the second embodiment. As illustrated in FIG. 13, the first printing operation MP1 of the present embodiment is performed in the same manner as the first printing operation MP1 of the first embodiment described above. As long as printing can be performed on the third printing region RP3 after the workpiece rotation operation MR, the first printing operation MP1 of the present embodiment may include an operation different from the first printing operation MP1 of the first embodiment described above.

Figure 14:
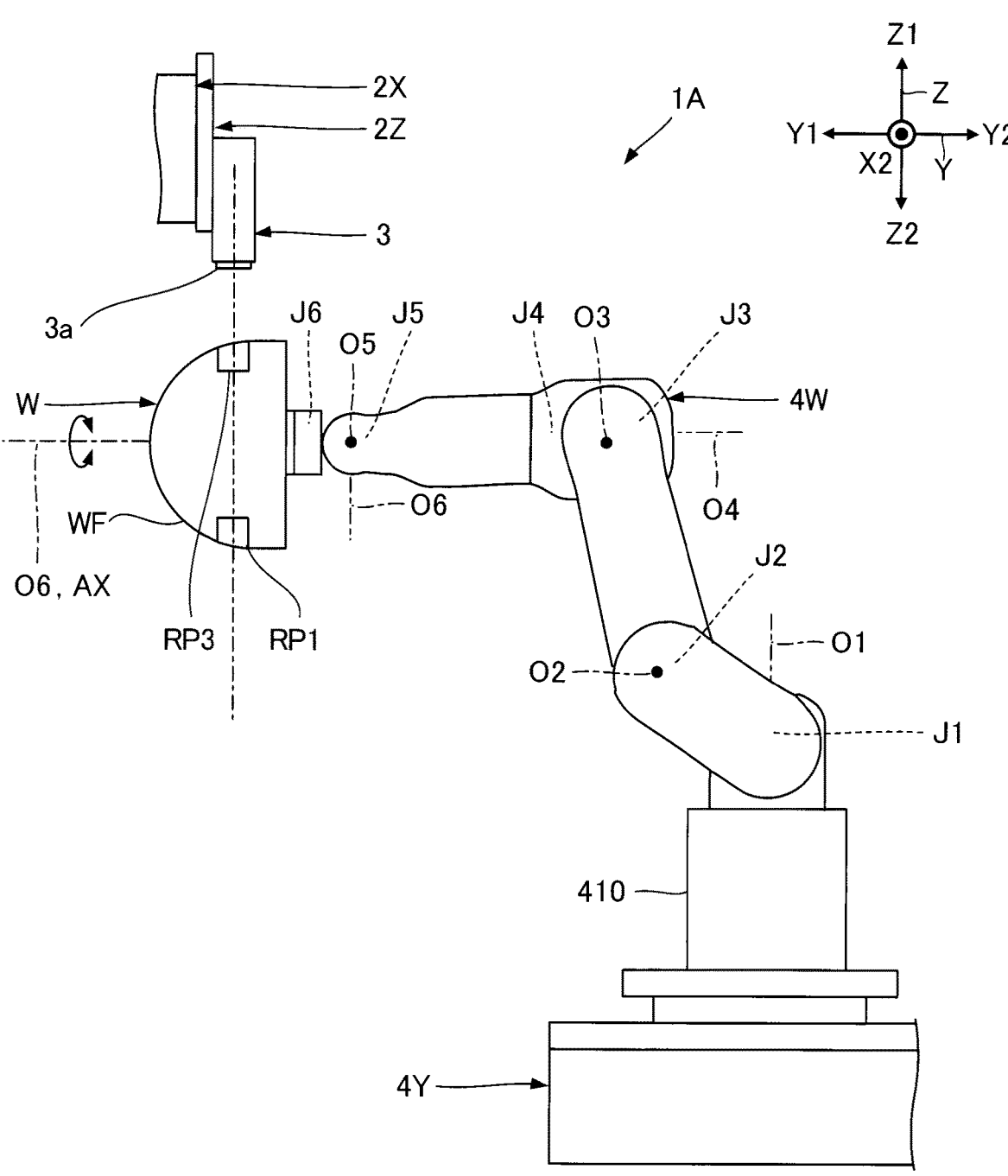
FIG. 14 is a diagram describing a head retracting operation and a workpiece rotation operation according to the second embodiment.

FIG. 14 is a diagram describing the head retracting operation ME and the workpiece rotation operation MR according to the second embodiment. As illustrated in FIG. 14, the head retracting operation ME of the present embodiment is performed in the same manner as the head retracting operation ME of the first embodiment described above. Meanwhile, a retracting distance of the head 3*a* from the workpiece W is set such that the head 3*a* does not come into contact with the workpiece W during the execution of the workpiece rotation operation MR, and is, for example, approximately several centimeters to tens of centimeters without being particularly limited. When the head 3*a* can be sufficiently moved in a direction away from the workpiece W by the operation of the X movement mechanism 2X, the head 3*a* may be retracted from the workpiece W by the operation of the X movement mechanism 2X without operating the Z movement mechanism 2Z. In addition, in the same manner as in Modification Example 1 to be described below, the head retracting operation ME may be executed by the operation of the Y movement mechanism 4Y.

In the workpiece rotation operation MR, a posture of the workpiece W is changed by operating the articulated robot 4W in a period between the first printing operation MP1 and the third printing operation MP3. Here, in the workpiece rotation operation MR, the articulated robot 4W operates such that the third printing region RP3 of the workpiece W can be located immediately below the head 3*a* when the third printing operation MP3 is to be executed.

In this manner, by adjusting the posture of the workpiece W by the operation of the articulated robot 4W, printing is easily performed on the workpiece W having various three-dimensional shapes, and the printing can also be easily performed on the first printing region RP1 and the third printing region RP3 which are regions of the same workpiece W facing different directions.

In the example illustrated in FIG. 14, each of the rotation axes O2, O3, and O5 of the articulated robot 4W is parallel to the X-axis and each of the rotation axes O4 and O6 is parallel to the Y-axis, over the execution period of the feeding operation MF. As described above, since the central axis AX of the workpiece W which is a rotator coincides with the rotation axis O6, the central axis AX is also parallel to the Y-axis.

The workpiece rotation operation MR of the present embodiment is performed by rotation of only the joint J6. Since the rotation axis O6 coincides with the rotation axis O4, the workpiece rotation operation MR can also be executed by rotation of the joint J4, instead of the rotation of the joint J6 or in addition to the rotation of the joint J6. Meanwhile, since a load on the joint J4 is more than a load of the joint J6, it is preferable to perform the workpiece rotation operation MR by the rotation of only the joint J6 from a viewpoint of improving accuracy of the workpiece rotation operation MR. Since when only the joint J4 is rotated, the joint J5 is easily affected when there is a positioning error in the joint J5 at the tip, it is preferable to rotate only the joint J6 located at the most tip.

Here, when the number of joints J configured to rotate around different rotation axes of the articulated robot 4W is N, N is six in the present embodiment. When the number of joints being rotated during the execution of the workpiece rotation operation MR among the N joints is M, M is one and is a natural number smaller than N. As described above, by reducing the number of joints J used for the workpiece rotation operation MR, it is possible to reduce a decrease in position accuracy of the workpiece W due to the operation of the articulated robot 4W. As a result, it is possible to reduce a positional deviation of the printing image on each of the first printing region RP1 and the third printing region RP3.

The joint J6 that is rotated during the execution of the workpiece rotation operation MR is an example of a "first joint", and is a joint closest to the tip, among the N joints. That is, the joint J6 is a joint having the smallest load among the joints J1 to J6. In this manner, by performing the workpiece rotation operation MR by using only one joint J6 as close as possible to the tip, it is possible to reduce a decrease in position accuracy of the workpiece W due to the operation of the articulated robot 4W. As a result, it is possible to reduce a positional deviation of the printing image on each of the first printing region RP1 and the third printing region RP3.

The workpiece rotation operation MR may be executed by rotating only the joint J5 depending on a position of the third printing region RP3 or an installation posture of the workpiece W. Here, the joint J5 is an example of a "second joint", and is a joint closest to the tip next to the first joint. That is, the joint J5 is a joint having the smallest load next to the joint J6 among the joints J1 to J6. Therefore, in this case as well, by performing the workpiece rotation operation MR, it is possible to reduce a decrease in position accuracy of the workpiece W due to the operation of the articulated robot 4W.

Here, since the rotation axis O6 of the joint J6 and the Y-axis are parallel to each other, when the workpiece rotation operation MR is performed by using only the joint J6, it is easy to match the printing start positions of the first printing operation MP1 and the third printing operation MP3. As a result, it is possible to reduce a positional deviation of the printing image on each of the first printing region RP1 and the third printing region RP3.

Further, since the rotation axis O5 of the joint J5 and the X-axis are parallel to each other, even when the workpiece rotation operation MR is performed by using only the joint J5, it is easy to match the printing start positions of the first printing operation MP1 and the third printing operation MP3. As a result, it is possible to reduce a positional deviation of the printing image on each of the first printing region RP1 and the third printing region RP3.

The three-dimensional object printing apparatus 1A of the present embodiment executes the transport operation MC of causing the articulated robot 4W to transport the workpiece W before the first printing operation MP1. Regarding a rotational acceleration of the joint J that is rotated during the execution of the workpiece rotation operation MR, the rotational acceleration in the workpiece rotation operation MR is preferably smaller than the rotational acceleration in the transport operation MC. As described above, by making the acceleration smaller in the workpiece rotation operation MR than in the transport operation MC, it is possible to reduce the deterioration of the image quality. Here, at a stage of the transport operation MC, the ink is not applied onto the workpiece W, and thus the acceleration does not matter. On the other hand, a stage of the workpiece rotation operation MR is after the ink is applied from the heads 3*a*_1 to 3*a*_4 by the execution of the first printing operation MP1, and when the acceleration of the workpiece rotation operation MR is large, the ink which is not sufficiently cured or solidified may be moved on the workpiece W. In particular, when the types of ink used for the heads 3*a*_1 to 3*a*_4 are different from each other and a plurality of types of ink droplets approach each other by moving each other, color mixture changes a color tone, which may significantly reduce image quality. Therefore, in order to reduce such a deterioration in image quality, the acceleration in the workpiece rotation operation MR is preferably set to be smaller than the acceleration in the transport operation MC.

As described above, in the period between the first printing operation MP1 and the workpiece rotation operation MR, the three-dimensional object printing apparatus 1A executes the head retracting operation ME of moving the head 3*a*_1 and the head 3*a*_2 in a direction away from the workpiece W by the operation of the Z movement mechanism 2Z_1 and the Z movement mechanism 2Z_2. Therefore, the heads 3*a*_1 to 3*a*_4 can be retracted from the workpiece W during the execution of the workpiece rotation operation MR. As a result, the heads 3*a*_1 to 3*a*_4 are prevented from coming into contact with the workpiece W during the execution of the workpiece rotation operation MR.

Figure 15:
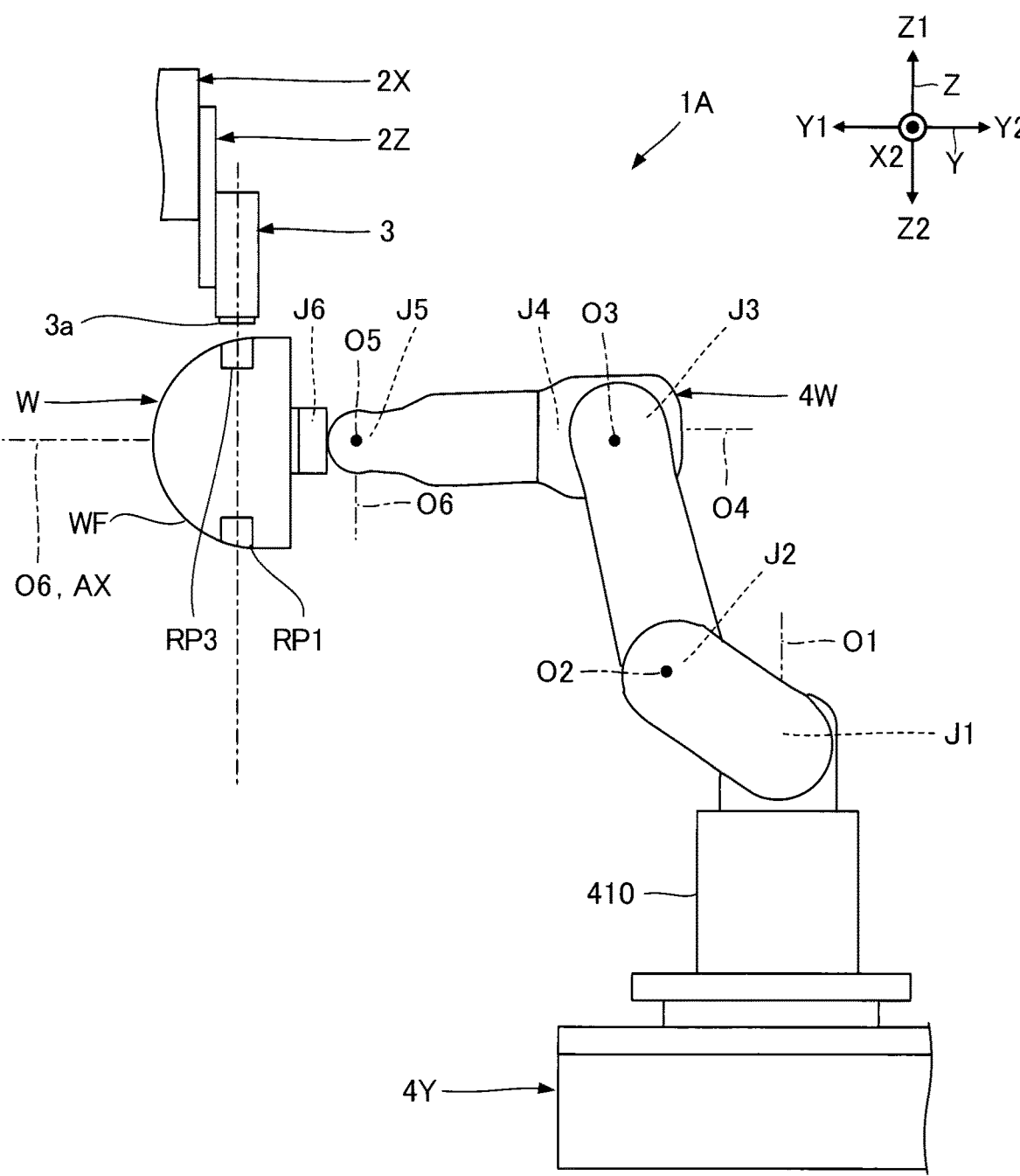
FIG. 15 is a diagram describing a third printing operation according to the second embodiment.

FIG. 15 is a diagram describing the third printing operation MP3 according to the second embodiment. During execution of the third printing operation MP3, the articulated robot 4W supports the workpiece W such that the third printing region RP3 is located immediately below the head 3a.

In the example illustrated in FIG. 15, each of the rotation axes O2, O3, and O5 of the articulated robot 4W is parallel to the X-axis, and each of the rotation axes O4 and O6 is parallel to the Y-axis. As described above, since the central axis AX of the workpiece W which is a rotator coincides with the rotation axis O6, the central axis AX is also parallel to the Y-axis.

In the third printing operation MP3, in the same manner as the first printing operation MP1, the heads 3a_1 to 3a_4 eject the inks toward the surface WF based on the print data while the X movement mechanism 2X moves the heads 3a_1 to 3a_4 and the sensor unit 30 along the X-axis, and the Z movement mechanisms 2Z_1 to 2Z_4 move the heads 3a_1 to 3a_4 along the Z-axis to follow the surface WF of the workpiece W. Here, the articulated robot 4W does not operate during the execution of the third printing operation MP3. Thus, the position and the posture of the workpiece W during the execution of the third printing operation MP3 are stabilized.

In this manner, by not operating the articulated robot 4W during the execution of the third printing operation MP3, printing with high accuracy can be performed on the third printing region RP3.

Here, the movement path RU2 of the heads 3a_1 to 3a_4 in the second printing operation MP2 may be the same as or different from the movement path RU1 of the heads 3a_1 to 3a_4 in the first printing operation MP1.

By the operation of the above three-dimensional object printing apparatus 1A, that is, the printing method using the three-dimensional object printing apparatus 1A, the printing can be performed on the first printing region RP1 and the third printing region RP3 of the workpiece W.

In the same manner as in the first embodiment described above, with the above second embodiment, the articulated robot 4W supports the workpiece W, and thus the workpiece W can be installed in a desired posture with respect to the heads 3a_1 to 3a_4, regardless of the three-dimensional shape of the workpiece W. Therefore, while operating the Z movement mechanisms 2Z_1 to 2Z_4 and the X movement mechanism 2X, the inks can be ejected from the heads 3a_1 to 3a_4 toward the first printing region RP1 and the third printing region RP3 on the workpiece W with high accuracy. In this manner, printing with high accuracy can be performed on the three-dimensional workpiece W while the workpiece W is easily installed.

Here, in the present embodiment, in the period between the first printing operation MP1 and the third printing operation MP3, the workpiece rotation operation MR is executed by the operation of the articulated robot 4W, and thus even when the first printing region RP1 and the third printing region RP3 are surfaces facing opposite directions, it is possible to reduce a positional deviation of a printing image with respect to each of the first printing region RP1 and the third printing region RP3.

3. Modification Example

Each embodiment in the above examples can be variously modified. Specific modification aspects that can be applied to each embodiment described above will be described below. The two or more aspects freely selected from the following examples can be appropriately merged within a range not mutually contradictory.

3-1. Modification Example 1

Figure 16:
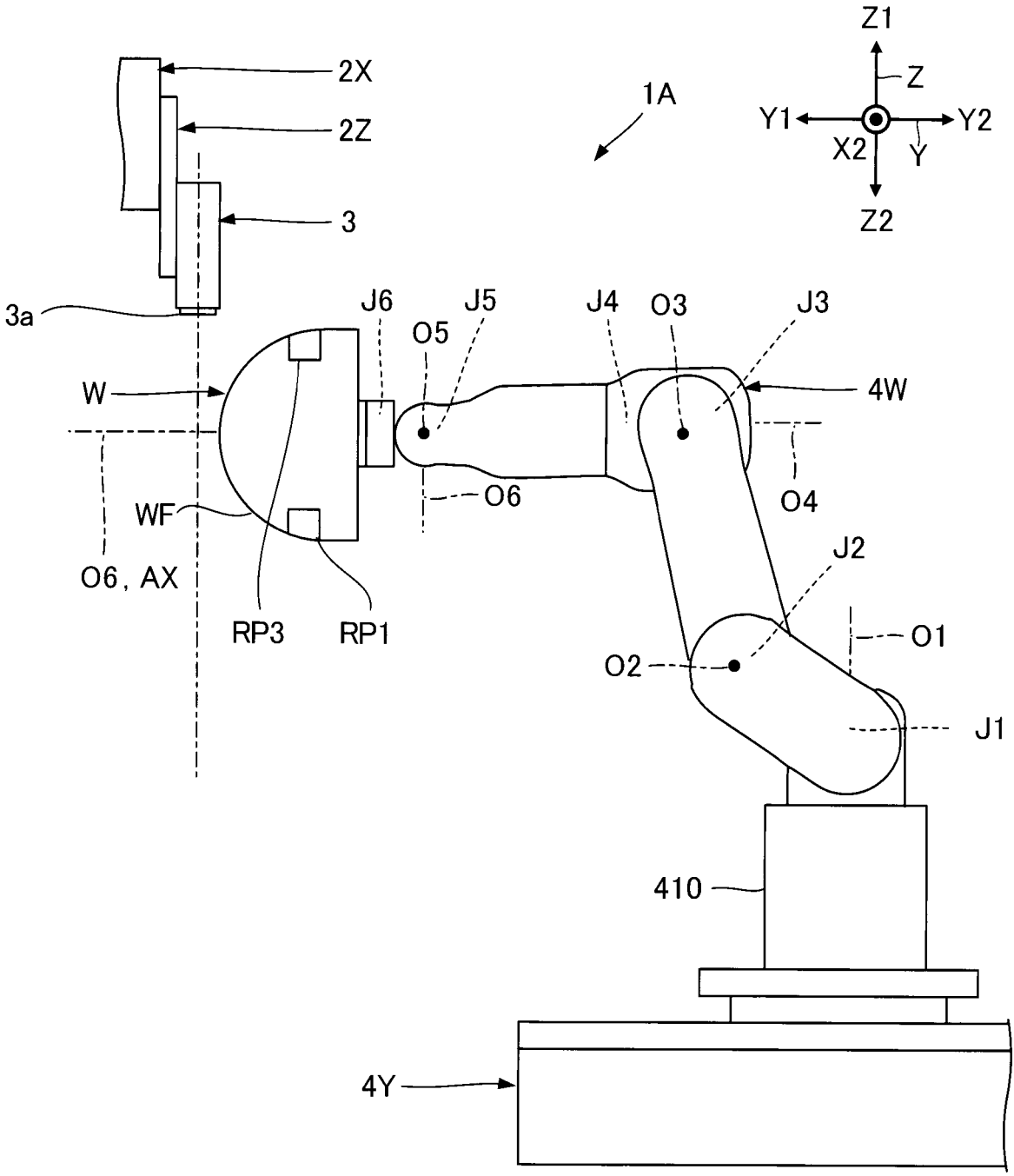
FIG. 16 is a diagram describing a head retracting operation and a workpiece rotation operation according to Modification Example 1.

FIG. 16 is a diagram describing the head retracting operation ME and the workpiece rotation operation MR according to Modification Example 1. In Modification Example 1, as illustrated in FIG. 16, the head retracting operation ME is executed by the operation of the Y movement mechanism 4Y. That is, in the head retracting operation ME of Modification Example 1, the articulated robot 4W moves in a direction away from the head 3a by the operation of the Y movement mechanism 4Y in a period between the first printing operation MP1 and the workpiece rotation operation MR. Here, a retracting distance of the head 3a with respect to the workpiece W is not particularly limited, and is, for example, approximately several centimeters to tens of centimeters.

As described above, the three-dimensional object printing apparatus 1A may execute the head retracting operation ME by the operation of the Y movement mechanism 4Y. In this case as well, the workpiece rotation operation MR can be executed in a state where the head 3a_1 and the head 3a_2 are retracted from the workpiece W. As a result, the head 3a_1 and the head 3a_2 are prevented from coming into contact with the workpiece W during the execution of the workpiece rotation operation MR. In addition, in this case as well, since the Y movement mechanism 4Y is a linear motion mechanism, even when the position of the workpiece W is returned to the original position for the subsequent third printing operation MP3, an error in position of the workpiece W is small as compared with the operation of the articulated robot 4W. Therefore, appropriate image quality can be obtained in the third printing operation MP3.

3-2. Modification Example 2

By combining the first embodiment and the second embodiment described above, the first printing operation MP1, the second printing operation MP2, and the third printing operation MP3 may be executed. For example, after the second printing operation MP2 of the first embodiment is executed, the head retracting operation ME, the workpiece rotation operation MR, and the third printing operation MP3 may be executed in this order. In this case, as necessary, the feeding operation MF is executed in a period between the head retracting operation ME and the third printing operation MP3 after the execution of the second printing operation MP2. Further, only the first printing operation MP1 may be executed. In this case, the feeding operation MF, the head retracting operation ME, and the workpiece rotation operation MR may be omitted.

3-3. Modification Example 3

In the embodiment described above, an aspect in which the number of Z movement mechanisms 2Z that move the head 3a along the Z-axis is four is described. Meanwhile, the number is not limited to this aspect described above, and the number or the number of heads 3a may be two or three or may be five or more. Here, when the number is three or more, one Z movement mechanism 2Z of any two Z movement mechanisms 2Z arranged in the movement direction along the X-axis during printing corresponds a "first Z movement mechanism", and the other Z movement mechanism 2Z corresponds to a "second Z movement mechanism". For example, in the embodiment described above, among the Z movement mechanisms 2Z_1 to 2Z_4, any one Z movement mechanism 2Z may be referred to as the "first Z movement mechanism", and any other one Z movement mechanism 2Z may be referred to as the "second Z movement mechanism".

Here, the head 3a that is moved along the Z-axis by the operation of the Z movement mechanism 2Z corresponding to the first Z movement mechanism corresponds to a "first head", and the head 3a that is moved along the Z-axis by the operation of the Z movement mechanism 2Z corresponding to the second Z movement mechanism corresponds to a "second head".

3-4. Modification Example 4

In the embodiment described above, an aspect in which the articulated robot 4W is an articulated robot having 6 axes is described. Meanwhile, the number of joints of the articulated robot 4W is not limited to six, and may be two or more and five or less or may be seven or more.

Here, when the articulated robot 4W has N joints (where N is a natural number of two or more) configured to rotate around different rotation axes, the number of joints rotating during the execution of the workpiece rotation operation MR of the second embodiment among the N joints may be M (where M is a natural number smaller than N). In this case as well, it is possible to reduce a decrease in position accuracy of the workpiece W due to the operation of the articulated robot 4W. As a result, in the same manner as the second embodiment, it is possible to reduce a positional deviation of the printing image on each of the first printing region RP1 and the third printing region RP3.

Further, among the N joints, a joint closest to a tip is the "first joint", and a joint closest to the tip next to the first joint is the "second joint". Further, a joint which is rotated during the execution of the workpiece rotation operation MR of the second embodiment may be either the first joint or the second joint. In this case as well, it is possible to reduce a decrease in position accuracy of the workpiece W due to the operation of the articulated robot 4W. As a result, in the same manner as the second embodiment, it is possible to reduce a positional deviation of the printing image on each of the first printing region RP1 and the third printing region RP3.

4. Appendixes

Hereinafter, appendixes to the present disclosure will be added.

Appendix 1. According to a first aspect which is an appropriate example of the present disclosure, there is provided a three-dimensional object printing apparatus including: a first head that ejects a first liquid from a first nozzle on to a workpiece; a second head that ejects a second liquid from a second nozzle onto the workpiece; a first Z movement mechanism that moves the first head along a Z-axis; a second Z movement mechanism that moves the second head along the Z-axis; an X movement mechanism that moves the first head and the second head along an X-axis intersecting with the Z-axis by collectively moving the first Z movement mechanism and the second Z movement mechanism along the X-axis; and an articulated robot that supports the workpiece.

In the above first aspect, since the articulated robot supports the workpiece, the workpiece can be installed in a desired posture with respect to the first head and the second head, regardless of a three-dimensional shape of the workpiece. Therefore, the liquid can be ejected from the first head and the second head toward the printing region on the workpiece with high accuracy while operating the first Z movement mechanism, the second Z movement mechanism, and the X movement mechanism. In this manner, printing with high accuracy can be performed on the three-dimensional workpiece while the workpiece is easily installed.

Appendix 2. In a second aspect which is an appropriate example of the first aspect, a first printing operation of causing the first head and the second head to eject the first liquid and the second liquid toward a first printing region on the workpiece while operating the first Z movement mechanism, the second Z movement mechanism, and the X movement mechanism is executed, the articulated robot does not change a position or a posture of the workpiece during the execution of the first printing operation. In the above second aspect, it is possible to reduce a deterioration in image quality of the printing by performing the printing operation while preventing a vibration or a speed fluctuation due to the operation of the articulated robot. Here, since the operation of the articulated robot is a combination of a plurality of rotational operations, the vibration or the speed fluctuation is likely to occur, whereas the operation of the Z movement mechanism and the X movement mechanism is a simple linear operation, and thus it is easy to improve operation accuracy. Therefore, by performing the printing operation by the operation of the first Z movement mechanism, the second Z movement mechanism, and the X movement mechanism while stopping the operation of the articulated robot, the deterioration in image quality is reduced.

Appendix 3. A third aspect which is an appropriate example of the second aspect, further includes: a Y movement mechanism that moves the articulated robot along a Y-axis intersecting with the Z-axis and the X-axis. In the above third aspect, the workpiece can be moved with high accuracy along the Y-axis without operating the articulated robot.

Appendix 4. In a fourth aspect which is an appropriate example of the third aspect, a second printing operation of causing the first head and the second head to eject the first liquid and the second liquid toward a second printing region adjacent to the first printing region on the workpiece while operating the first Z movement mechanism, the second Z movement mechanism, and the X movement mechanism is executed, the articulated robot does not change the position or the posture of the workpiece during the execution of the second printing operation, and the Y movement mechanism moves the articulated robot along the Y-axis and the articulated robot does not change the position or the posture of the workpiece in a period between the first printing operation and the second printing operation. In the above fourth aspect, a feeding operation by the operation of the Y movement mechanism can be executed in a state where the operation of the articulated robot is stopped in a period between a printing path by the first printing operation and a printing path by the second printing operation. Here, since the operation of the articulated robot is a combination of a plurality of rotational operations, the vibration or the speed fluctuation is likely to occur, whereas the operation of the Y movement mechanism is a simple linear operation, and thus it is easy to improve the operation accuracy. Therefore, by performing the feeding operation by the operation of the Y movement mechanism while stopping the operation of the articulated robot, it is possible to reduce a positional deviation between the printing paths in continuous printing images.

Appendix 5. In a fifth aspect which is an appropriate example of the fourth aspect, a part of the first printing region overlaps with the second printing region, and another part of the first printing region does not overlap with the second printing region. In the above fifth aspect, when parts of the first printing region and the second printing region overlap with each other and positioning accuracy between these regions is low, a significant deterioration in image quality occurs. Therefore, in this case, an effect of executing the feeding operation for moving the workpiece with high accuracy along the Y-axis without operating the articulated robot is remarkable.

Appendix 6. In a sixth aspect which is an appropriate example of the second aspect, a third printing operation of causing the first head and the second head to eject the first liquid and the second liquid toward a third printing region different from the first printing region on the workpiece while operating the first Z movement mechanism, the second Z movement mechanism, and the X movement mechanism is executed, the articulated robot does not change the position or the posture of the workpiece during the execution of the third printing operation, and in a period between the first printing operation and the third printing operation, a workpiece rotation operation of changing the posture of the workpiece by operating the articulated robot is executed. In the above sixth aspect, by adjusting the posture of the workpiece by the operation of the articulated robot, the printing can be easily performed on the workpiece having various three-dimensional shapes, and the printing can be easily performed on regions facing different directions among regions of the same workpiece. Further, by not operating the articulated robot during the execution of the third printing operation, printing with high accuracy can be performed on the third printing region.

Appendix 7. In a seventh aspect which is an appropriate example of the sixth aspect, the articulated robot has N number of joints configured to rotate around rotation axes, N being a natural number of two or more, and the number of joints rotating during the execution of the workpiece rotation operation among the N joints is M, M being a natural number smaller than N. In the above seventh aspect, it is possible to reduce a decrease in workpiece position accuracy due to the operation of the articulated robot. As a result, it is possible to reduce a positional deviation of the printing image on each of the first printing region and the third printing region.

Appendix 8. In an eighth aspect which is an appropriate example of the seventh aspect, when a joint closest to a tip is set as a first joint and a joint closest to the tip next to the first joint is set as a second joint among the N joints, a joint rotating during the execution of the workpiece rotation operation is any one of the first joint and the second joint. In the above eighth aspect, it is possible to reduce a decrease in workpiece position accuracy due to the operation of the articulated robot. As a result, it is possible to reduce a positional deviation of the printing image on each of the first printing region and the third printing region.

Appendix 9. In a ninth aspect which is an appropriate example of the eighth aspect, a rotation axis of the second joint and the X-axis are parallel to each other. In the above ninth aspect, it is easy to match printing start positions of the first printing operation and the third printing operation. As a result, it is possible to reduce a positional deviation of the printing image on each of the first printing region and the third printing region.

Appendix 10. In a tenth aspect which is an appropriate example of the eighth aspect, a rotation axis of the first joint and a Y-axis intersecting with the X-axis are parallel to each other. In the above tenth aspect, it is easy to match printing start positions of the first printing operation and the third printing operation. As a result, it is possible to reduce a positional deviation of the printing image on each of the first printing region and the third printing region.

Appendix 11. In an eleventh aspect which is an appropriate example of the eighth aspect, a transport operation of causing the articulated robot to transport the workpiece is executed before the first printing operation, and regarding a rotational acceleration of the joint rotating during the execution of the workpiece rotation operation, the rotational acceleration in the workpiece rotation operation is less than the rotational acceleration in the transport operation. In the above eleventh aspect, a deterioration in image quality can be reduced by making the acceleration smaller in the workpiece rotation operation than in the transport operation. Here, since the ink is not applied onto the workpiece at a stage of the transport operation, there is no problem. On the other hand, a stage of the workpiece rotation operation is after the ink is applied from the first head and the second head, and when the acceleration of the workpiece rotation operation is large, the ink which is not sufficiently cured or solidified may be moved on the workpiece. In particular, when the types of ink used for the first head and the second head are different from each other and two types of ink droplets approach each other by moving each other, color mixture changes a color tone, which may significantly reduce image quality. Therefore, in order to reduce such a deterioration in image quality, the acceleration in the workpiece rotation operation is set to be smaller than the acceleration in the transport operation.

Appendix 12. In a twelfth aspect which is an appropriate example of the sixth aspect, in a period between the first printing operation and the workpiece rotation operation, a head retracting operation of moving the first head and the second head in a direction away from the workpiece by the operation of the first Z movement mechanism and the second Z movement mechanism is executed. In the above twelfth aspect, the first head and the second head can be retracted from the workpiece during the execution of the workpiece rotation operation. As a result, the first head and the second head are prevented from coming into contact with the workpiece during the execution of the workpiece rotation operation.

Appendix 13. A thirteenth aspect which is an appropriate example of the sixth aspect, further includes: a Y movement mechanism that moves the articulated robot along a Y-axis intersecting with the Z-axis and the X-axis, in which in a period between the first printing operation and the workpiece rotation operation, a head retracting operation of moving the articulated robot in a direction away from the first head and the second head by an operation of the Y movement mechanism is executed. In the above thirteenth aspect, the workpiece rotation operation can be executed in a state where the first head and the second head are retracted from the workpiece. As a result, the first head and the second head are prevented from coming into contact with the workpiece during the execution of the workpiece rotation operation.

What is claimed is:

1. A three-dimensional object printing apparatus comprising:

a first head that ejects a first liquid from a first nozzle onto a workpiece;

a second head that ejects a second liquid from a second nozzle onto the workpiece;

a first Z movement mechanism that moves the first head along a Z-axis;

a second Z movement mechanism that moves the second head along the Z-axis;

an X movement mechanism that moves the first head and the second head along an X-axis intersecting with the Z-axis by collectively moving the first Z movement mechanism and the second Z movement mechanism along the X-axis;

an articulated robot that supports the workpiece;

a Y movement mechanism that moves the articulated robot along a Y-axis intersecting with the Z-axis and the X-axis; and a control portion configured to:

execute a first printing operation in which the first head and the second head eject the first liquid and the second liquid toward a first printing region on the workpiece while driving the first Z movement mechanism, the second Z movement mechanism, and the X movement mechanism, execute a second printing operation in which the first head and the second head eject the first liquid and the second liquid toward a second printing region adjacent to the first printing region on the workpiece while driving the first Z movement mechanism, the second Z movement mechanism, and the X movement mechanism, and between the first printing operation and the second printing operation, drive the Y movement mechanism to move the articulated robot along the Y-axis while the articulated robot does not change a position or a posture of the workpiece.

2. The three-dimensional object printing apparatus according to claim 1, wherein the control portion is configured to control the articulated robot such that the position or the posture of the workpiece is not changed during the execution of the first printing operation.

3. The three-dimensional object printing apparatus according to claim 1, wherein the control portion is configured to control the articulated robot such that the position or the posture of the workpiece is not changed during the execution of the second printing operation.

4. The three-dimensional object printing apparatus according to claim 3, wherein a part of the first printing region overlaps with the second printing region, and another part of the first printing region does not overlap with the second printing region.

5. The three-dimensional object printing apparatus according to claim 1, wherein a third printing operation of causing the first head and the second head to eject the first liquid and the second liquid toward a third printing region on the workpiece while operating the first Z movement mechanism, the second Z movement mechanism, and the X movement mechanism is executed, the articulated robot does not change the position or the posture of the workpiece during the execution of the third printing operation, and in a period between the first printing operation and the third printing operation, a workpiece rotation operation of changing the posture of the workpiece by operating the articulated robot is executed.

6. The three-dimensional object printing apparatus according to claim 5, wherein the articulated robot has N number of joints configured to rotate around different rotation axes, N being a natural number of two or more, and the number of joints rotating during the execution of the workpiece rotation operation among the N joints is M, M being a natural number smaller than N.

7. The three-dimensional object printing apparatus according to claim 6, wherein when a joint closest to a tip is set as a first joint and a joint closest to the tip next to the first joint is set as a second joint among the N joints, a joint rotating during the execution of the workpiece rotation operation is any one of the first joint and the second joint.

8. The three-dimensional object printing apparatus according to claim 7, wherein a rotation axis of the second joint and the X-axis are parallel to each other.

9. The three-dimensional object printing apparatus according to claim 7, wherein a rotation axis of the first joint and a Y-axis intersecting with the X-axis are parallel to each other.

10. The three-dimensional object printing apparatus according to claim 7, wherein a transport operation of causing the articulated robot to transport the workpiece is executed before the first printing operation, and regarding a rotational acceleration of the joint rotating during the execution of the workpiece rotation operation, the rotational acceleration in the workpiece rotation operation is less than the rotational acceleration in the transport operation.

11. The three-dimensional object printing apparatus according to claim 5, wherein in a period between the first printing operation and the workpiece rotation operation, a head retracting operation of moving the first head and the second head in a direction away from the workpiece by the operation of the first Z movement mechanism and the second Z movement mechanism is executed.

12. The three-dimensional object printing apparatus according to claim 5, wherein in a period between the first printing operation and the workpiece rotation operation, a head retracting operation of moving the articulated robot in a direction away from the first head and the second head by an operation of the Y movement mechanism is executed.

* * * * *